United States Patent
Tang et al.

(10) Patent No.: US 8,559,891 B2
(45) Date of Patent: Oct. 15, 2013

(54) HIGH DYNAMIC RANGE TRANSCEIVER FOR COGNITIVE RADIO

(75) Inventors: Haiyun Tang, Saratoga, CA (US); Stuart Rumley, Redwood City, CA (US)

(73) Assignee: Adaptrum, Inc., San Jose, CA (US)

( * ) Notice: Subject to any disclaimer, the term of this patent is extended or adjusted under 35 U.S.C. 154(b) by 38 days.

(21) Appl. No.: 13/190,417

(22) Filed: Jul. 25, 2011

(65) Prior Publication Data

US 2011/0279736 A1 Nov. 17, 2011

Related U.S. Application Data

(62) Division of application No. 12/034,633, filed on Feb. 20, 2008, now abandoned.

(60) Provisional application No. 60/890,801, filed on Feb. 20, 2007.

(51) Int. Cl.
*H04B 1/38* (2006.01)
*H04N 5/50* (2006.01)

(52) U.S. Cl.
USPC .......... 455/73; 348/731; 348/725; 455/179.1; 455/180.1; 341/126; 341/155

(58) Field of Classification Search
USPC .............. 455/73, 179.1, 180.1; 348/731, 725; 341/126, 155
See application file for complete search history.

(56) References Cited

U.S. PATENT DOCUMENTS

| | | | |
|---|---|---|---|
| 2007/0013570 A1* | 1/2007 | Gaggl et al. | 341/155 |
| 2009/0067555 A1* | 3/2009 | Hosoya et al. | 375/344 |
| 2009/0322950 A1* | 12/2009 | Mitsunaka et al. | 348/572 |
| 2012/0326906 A1* | 12/2012 | Haroun et al. | 341/143 |

* cited by examiner

*Primary Examiner* — Nay A Maung
*Assistant Examiner* — Erica Fleming-Hall
(74) *Attorney, Agent, or Firm* — West & Associates, A PC; Theodore A. Marsh; Stuart J. West

(57) ABSTRACT

Embodiments of cognitive radio technology can recover and utilize under-utilized portions of statically-allocated radio-frequency spectrum. A plurality of sensing methods can be employed. Transmission power control can be responsive to adjacent channel measurements. Digital pre-distortion techniques can enhance performance. Embodiments of a high DNR transceiver architecture can be employed.

5 Claims, 23 Drawing Sheets

HIGH DYNAMIC RANGE TRANSCEIVER FOR COGNITIVE RADIO

PRIORITY

This application is related to and claims priority under 35 U.S.C. 119(e) to U.S. Provisional Patent Application No. 60/890,801 filed on Feb. 20, 2007 entitled "SYSTEM AND METHOD FOR COGNITIVE RADIO" by Haiyun Tang the complete content of which is hereby incorporated by reference.

STATEMENT REGARDING FEDERALLY SPONSORED RESEARCH AND DEVELOPMENT

This invention was made with Government support under contract FA8750-05-C-0067 awarded by the Air Force. The Government has certain rights in the invention.

BACKGROUND

1. Field of the Invention

The inventions herein described relate to systems and methods for cognitive radio.

2. Description of the Related Art

Spectrum Utilization Problems

A recent study by the FCC Spectrum Task Force [United States' Federal Communications Commission (FCC), "Report of the spectrum efficiency working group," November 2002, http://www.fcc.gov/sptf/files/IPWGFinalReport.pdf] found that while the available spectrum becomes increasingly scarce, the assigned spectrum is significantly underutilized. This imbalance between spectrum scarcity and spectrum underutilization is especially inappropriate in this Information Age, when a significant amount of spectrum is needed to provide ubiquitous wireless broadband connectivity, which is increasingly becoming an indispensable part of everyday life.

Static spectrum allocation over time can also result in spectrum fragmentation. With lack of an overall plan, spectrum allocations in the US and other countries over the past several decades can appear to be random.

Despite some efforts to serve best interests at the time, this leads to significant spectrum fragmentation over time. The problem is exacerbated at a global level due to a lack of coordinated regional spectrum assignments. In order to operate under such spectrum conditions, a device can benefit from operational flexibility in frequency and/or band shape; such properties can help to maximally exploit local spectrum availability.

To address the above problems, an improved radio technology is needed that is capable of dynamically sensing and locating unused spectrum segments, and, communicating using these spectrum segments while essentially not causing harmful interference to designated users of the spectrum. Such a radio is generally referred to as a cognitive radio, although strictly speaking, it may perform only spectrum cognition functions and therefore can be a subtype of a broad-sense cognitive radio [J. M. III, "Cognitive radio for flexible mobile multimedia communications," *Mobile Networks and Applications*, vol. 6, September 2001.] that learns and reacts to its operating environment. Key aspects of a cognitive radio can include:

Sensing: a capability to identify used and/or unused segments of spectrum.

Flexibility: a capability to change operating frequency and/or band shape; this can be employed to fit into unused spectrum segments.

Non-interference: a capability to avoid causing harmful interference to designated users of the spectrum.

Such a cognitive radio technology can improve spectrum efficiency by dynamically exploiting underutilized spectrum, and, can operate at any geographic region without prior knowledge about local spectrum assignments. It has been an active research area recently. FCC spectrum reform initiatives FCC has been at the forefront of promoting new spectrum sharing technologies. In April 2002, the FCC issued an amendment to Part 15 rules that allows ultra-wideband (UWB) underlay in the existing spectrum [FCC, "FCC first report and order: Revision of part 15 of the commission's rules regarding ultra-wideband transmission systems," ET Docket No. 98-153, April 2002]. In June 2002, the FCC established a Spectrum Policy Task Force (SPTF) whose study on the current spectrum usage concluded that "many portions of the radio spectrum are not in use for significant periods of time, and that spectrum use of these 'white spaces' (both temporal and geographic) can be increased significantly". SPTF recommended policy changes to facilitate "opportunistic or dynamic use of existing bands." In December 2003, FCC issued the notice of proposed rule making on "Facilitating Opportunities for Flexible, Efficient and Reliable Spectrum Use Employing Cognitive Radio Technologies" [FCC, "Facilitating opportunities for flexible, efficient, and reliable spectrum use employing cognitive radio technologies," ET Docket No. 03-108, December 2003] stating that "by initiating this proceeding, we recognize the importance of new cognitive radio technologies, which are likely to become more prevalent over the next few years and which hold tremendous promise in helping to facilitate more effective and efficient access to spectrum."

While both UWB and cognitive radio are considered as spectrum sharing technologies, their approaches to spectrum sharing are substantially different. UWB is an underlay (below noise floor) spectrum sharing technology, while cognitive radio is an overlay (above noise floor) and interlay (between primary user signals) spectrum sharing technology as shown in FIG. 1. Through sensing combined with operational flexibility, a cognitive radio can identify and make use of spectral "white spaces" between primary user signals. Because a cognitive user signal resides in such "white spaces", high signal transmission power can be permitted as long as signal power leakage into primary user bands does not embody harmful interference.

Broadcast TV Bands.

Exemplary broadcast TV bands are shown in Graph 200 of FIG. 2. Each TV channel is 6 MHz wide. Between 0 and 800 MHz, there are a total of 67 TV channels (Channels 2 to 69 excluding Channel 37 which is reserved for radio astronomy). The NPRM [FCC, May 2004, op. cit.] excludes certain channels for unlicensed use: Channels 2-4, which are used by TV peripheral devices, and Channels 52-69, which are considered for future auction. Among the channels remaining, Channels 5-6, 7-13, 21-36, and 38-51 are available for unlicensed use in all areas. Unlicensed use in Channels 14-20 is allowed only in areas where they are not used by public safety agencies [FCC, May 2004, op. cit.].

It can be appreciated that Channels 52-69 are currently used by TV broadcasters and it is not clear if/when they will be vacated. There is significant interference in the lower channels 5-6 and 7-13. Based on these considerations, the spectrum segment 470-806 MHz covering TV channels 14-69 can be of particular interest.

Spectrum Opportunity in the TV Bands

Spectrum opportunity can be a direct result of incumbent system inefficiency. In TV bands, a signal from a TV tower can cover an area with a radius of tens of kilometers. TV receivers can be sensitive to interference such that TV cell planning may be very conservative to ensure there is essentially no co-channel interference. This can leave a substantial amount of "white spaces" between co-channel TV cells as illustrated in the Map 300 of FIG. 3. Those "white spaces" can constitute an opportunistic region for cognitive users on a particular TV channel. Each TV channel may have a differently shaped opportunistic region. The total spectrum opportunity at any location can comprise the total number of opportunistic regions covering the location. A measurement in one locality shows an average spectrum opportunity in TV channels 14-69 of about 28 channels; that can be expressed as an equivalent bandwidth of approximately 170 MHz.

DETAILED DESCRIPTION

Figure 4:
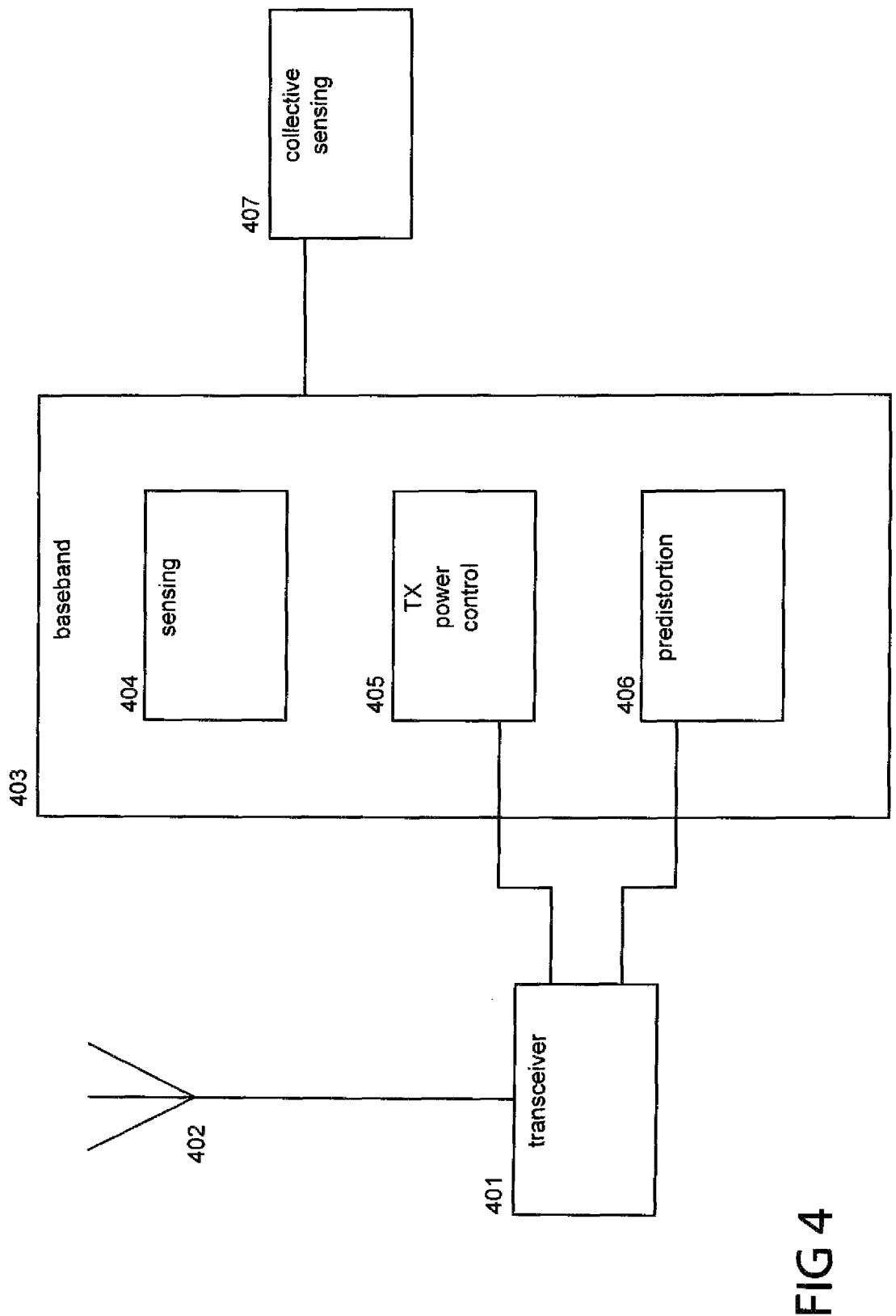
FIG. 4 diagram: cognitive radio system

FIG. 4 depicts an embodiment of a cognitive radio system in block diagram. A transceiver 401 can be coupled with and/or in communication with one or more antennae 402. Baseband signal processing can be provided by elements of a baseband processor 403. Elements of a baseband processor 403 can comprise a sensing processor 404, a transmit power control element 405, and a pre-distortion element 406. In some embodiments a pre-distortion element 406 can be coupled with and/or in communication with a transceiver 401. In some embodiments a transmit power control element can be coupled with and/or in communication with a transceiver 401. In some embodiments a collective sensing element 407 can be coupled with and/or in communication with a baseband processor 403 and/or elements comprising a baseband processor.

In some embodiments transceiver 401 can comprise transceiver and/or transmitter and/or receiver mechanisms disclosed herein. In some embodiments sensing element 404 can comprise one or more sensing mechanisms as described herein. By way of example and not limitation these sensing mechanisms can include energy sensing, NTSC signal sensing, and/or ATSC signal sensing. In some embodiments a collective sensing element 407 can provide collective sensing mechanisms as described herein.

In some embodiments transmit power control 405 can support adaptive transmit power control mechanisms described herein. In some embodiments pre-distortion element 406 can provide digital pre-distortion mechanisms as described herein.

In some embodiments baseband processor 403 can support additional processing mechanisms as described herein. By way of example and not limitation these mechanisms can include filtering and/or reconstruction.

RF System Analysis

Input Signal Dynamic Range

Figure 1:
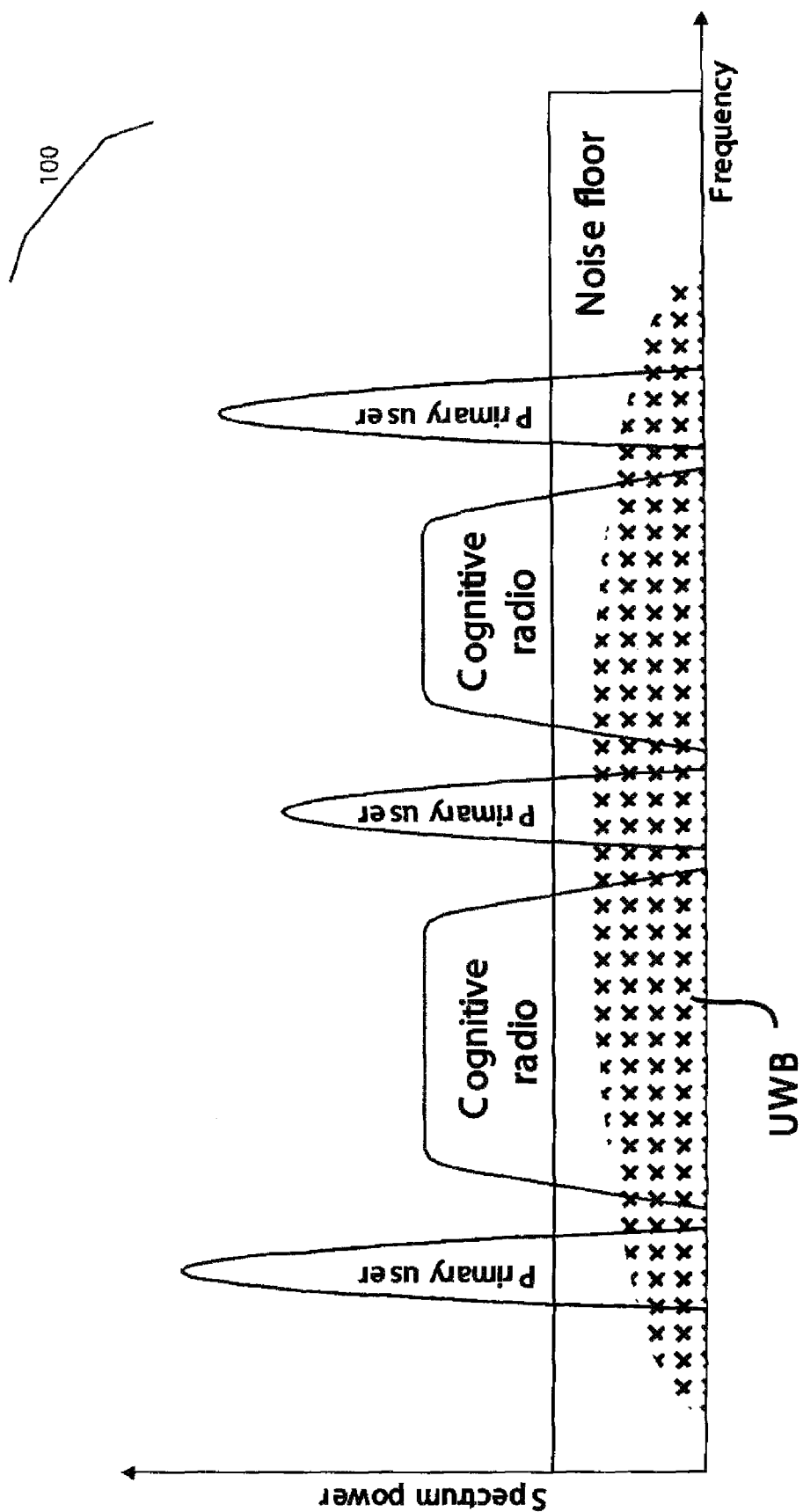
FIG. 1 graph of spectrum sharing technologies: UWB and cognitive radio
Figure 2:
FIG. 2 graph of exemplary television channel bands
Figure 3:
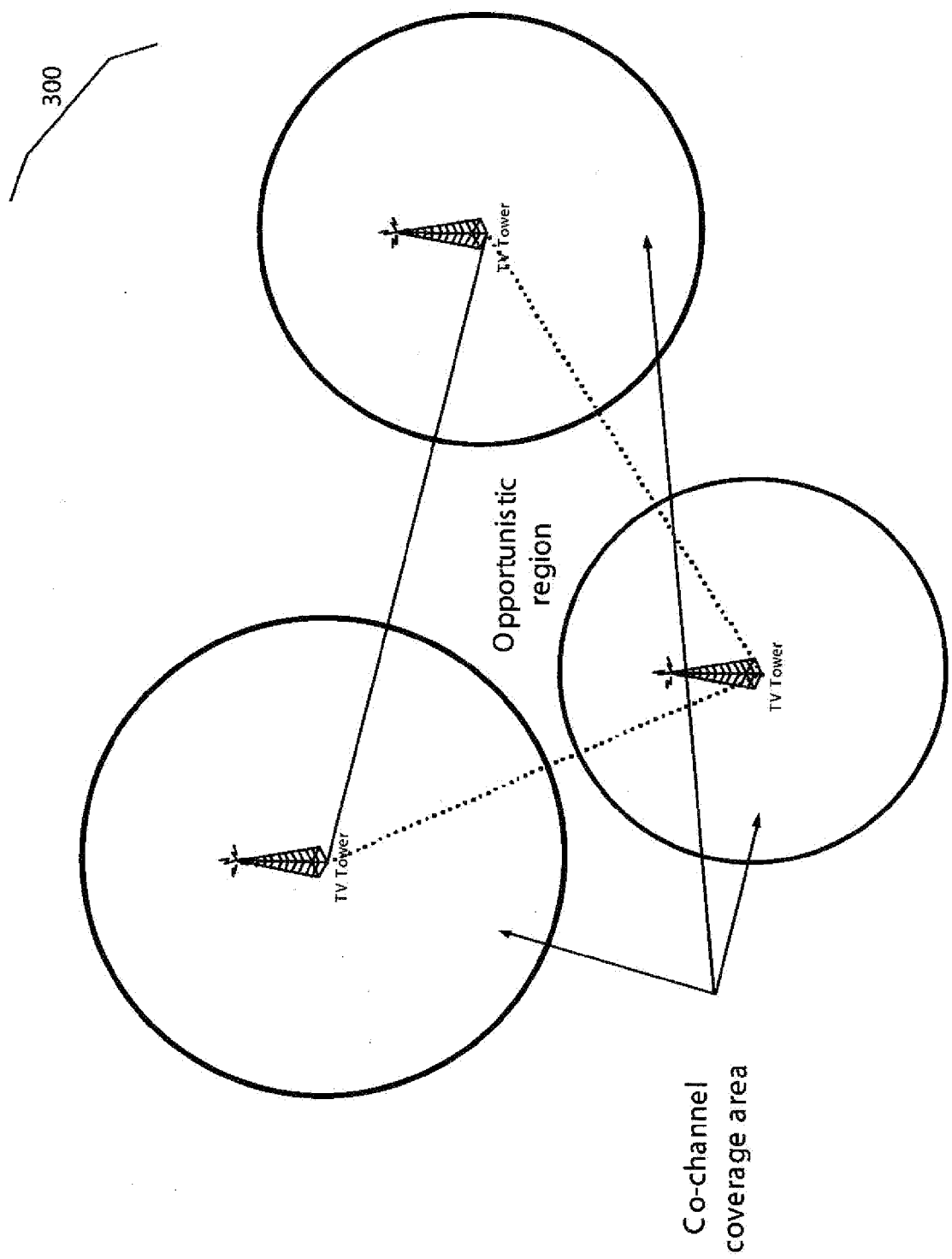
FIG. 3 map of television co-channel coverage areas and opportunistic region

The diagram 200 of FIG. 2 depicts an embodiment of a channel-based signal transmission scheme. Each of the channel signals in an embodiment can be considered to be independent. Hence, the total signal power over all channels considered (for example, TV Channels 14-69) can be computed as the sum of the individual signal powers of those channels.

Considering the wideband signal over all the channels in an embodiment comprising TV channels, a total signal bandwidth can be 336 MHz and an antenna thermal noise floor over the signal bandwidth can be calculated:

$$N_0^{dB} = 10\log_{10}(kTB) = -174 + 10\log_{10}(336 \times 10^6) \approx -89 \text{ dBm} \quad (1)$$

In some embodiments, a maximum measured signal power can be approximately −20 dBm.

For an individual TV channel in an embodiment, a thermal noise floor can be $$n_0^{dB} = -174 + 10\log_{10}(6 \times 10^6) \approx -106 \text{ dBm} \quad (2)$$

In some embodiments, a maximum single-channel power can have a value of approximately −20 dBm. In an embodiment of a cognitive radio system that operates close to the noise floor, a receiver can see a channel power disparity of $$-20 - (-106 + 6) \approx 80 \text{ dB} \quad (3)$$

assuming a receiver noise figure of 6 dB.

Third-order Intermodulation

In an ideal RF receive chain, all RF components can be perfectly linear and there is no distortion on the received signal after the signal has been processed by the RF receive chain. Real-world RF components—especially active RF components like amplifiers and mixers—can exhibit some degree of nonlinearity, resulting in signal distortion. Small-signal nonlinearity of a single RF component or cascaded RF components can be modeled by the following input-output relationship $$y(t) = \alpha_0 + \alpha_1 x(t) + \alpha_2 x^2(t) + \alpha_3 x^3(t) + \quad (4)$$

where x(t) is the input signal and y(t) is the output signal and in some typical embodiments the nonlinearity can be dominated by the low-order nonlinear terms.

RF components typically operate on passband signals. For passband signals, even-order nonlinear terms can be discarded when appropriate filtering is performed on the RF chain. The small signal nonlinearity can then be approximated as:

$$y(t) \approx \alpha_1 x(t) + \alpha_3 x^3(t) \quad (5)$$

retaining only the lowest odd order distortion term.

When a passband signal with baseband equivalent representation $s_B(t)$ passes through an element with nonlinear transfer function (3), the baseband equivalent representation of the output signal can be expressed as $$\underbrace{\alpha_1 s_B(t)}_{Signal} + \underbrace{\frac{3\alpha_3}{4}|s_B(t)|^2 s_B(t)}_{3rd\text{-}order\,distortion} \quad (6)$$

At the output, the ratio of the distortion power to the signal power, which is also the inverse of the dynamic range, can be expressed as:

$$P_{DR}^{-1} = \frac{\left(\frac{3\alpha_3}{4}\right)^2 E[|s_B(t)|^6]}{\alpha_1^2 E[|s_B(t)|^2]}$$

$$= \frac{\left(\frac{3\alpha_3}{4}\right)^2 E[|s_B(t)|^6]}{\alpha_1^2 E[|s_B(t)|^2]}$$

$$= \frac{1}{\alpha_1^2}\left(\frac{3\alpha_3}{4}\right)^2 \{E[|s_B(t)|^2]\}^2 \Gamma \quad (7)$$

where $$\Gamma = \frac{E[|s_B(t)|^6]}{\{E[|s_B(t)|^2]\}^3} \quad (8)$$

is a factor that depends essentially only on the signal structure of $s_B(t)$. For example, $\Gamma$ is approximately 7.5 dB if $s_B(t)$ is white noise.

Suppose $s_B(t)$ is a combined signal over all TV channels with power $$P_{In} = E[|s_B(t)|^2] \quad (9)$$

The gain can be defined $$g = \alpha_1^2 \quad (10)$$

and output signal power $$P_{Signal} = g P_{In} \quad (11)$$

Using a two-tone IP3 relationship $$\frac{1}{\alpha_1^2}\left(\frac{3\alpha_3}{4}\right)^2 = \frac{g^2}{P_{IP3}^2} \quad (12)$$

It can be appreciated that a third-order intercept point (IP3 or TOI) is the point at which a linear extrapolation (as a function of input power) of linear output power and third-order distortion power level meet.

Thus $$P_{DR}^{-1} = \frac{g^2}{P_{IP3}^2} P_{In}^2 \Gamma = \frac{P_{Signal}^2}{P_{IP3}^2}\Gamma \quad (13)$$

or in dB scale $$P_{DR}^{dB} = 2P_{IP3}^{dB} - 2P_{Signal}^{dB} - \Gamma^{dB} \quad (14)$$

Since the output 3rd-order distortion power is $$P_{IM3} = \left(\frac{3\alpha_3}{4}\right)^2 E[|s_B(t)|^6] \quad (15)$$

then, according to Equations (7) and (14)

$$P_{IM3}^{dB} = P_{Signal}^{dB} - P_{DR}^{dB} \quad (16)$$
$$= 3P_{Signal}^{dB} - 2P_{IP3}^{dB} + \Gamma^{dB}$$

Note that the term $\Gamma$ in Equation (16) accounts for added distortion that can result from a particular signal structure. When an input signal $s_B(t)$ is essentially a sinusoid (i.e. a single tone in frequency domain), $\Gamma^{dB} = 0$.

Overview of RF Receiver Functions

The functions of a RF receiver system can comprise: a) Frequency translation and channel selection; and b) Signal amplification.

Direct RF Sampling

An RF signal can reside in a particular frequency band $$[f_c - W, f_c + W]$$

where $f_c$ is a carrier frequency and 2W is a signal bandwidth. In order to retrieve information content from the signal, the signal can be digitized.

In theory, it is possible to directly sample the RF signal at a carrier frequency. Such an approach, however, can be prohibitively expensive in terms of hardware cost and power consumption. For example, if a carrier frequency is 600 MHz, direct Nyquist sampling of an associated RF signal can require a sampling frequency at least $2(f_c - W)$ or 1.2 GHz. In some embodiments an overall RF signal can contain both strong and weak signal contents, e.g. both TV signals and cognitive radio signals. A high-resolution ADC can be advantageously specified for some such embodiments. By way of non-limiting example, for a power difference between the strong and weak signals of 70 dB, an ADC with a resolution of at least 12 bits can be specified in some typical embodiments. Such ADC requirements can present realization challenges, given that some embodiments of current commercial ADCs can run at about 1 GHz sampling frequency, with 8-bit resolution [National Semiconductor Corporation, "ADC081000 High Performance, Low Power 8-Bit, 1 GSPS A/D Converter", DS200681, 2004], [Maxim Integrated Products, "MAX108 Data Sheet: ±5V, 1.5 Gsps, 8-Bit ADC with On-Chip 2.2 GHz Track/Hold Amplifier", 19-1492; Rev 1; October 2001]. Direct RF sampling embodiments may become a increasingly advantageous in the future, as ADC and related technologies evolve.

Frequency Translation and Channel Selection

The high cost of RF direct sampling can be a result of the sampling of unnecessary signal contents below $f_c - W$. Given an information bandwidth of 2W, Nyquist sampling only requires a sampling frequency of 2W in the circumstance that the signal center frequency can be shifted from the carrier frequency $f_c$ to DC, i.e.

$$[f_c-W, f_c-W] \rightarrow [-W, W] \qquad (17)$$

Such frequency translation can typically be achieved in an RF receiver through mixing. In addition to performing frequency translation, a receiver can also perform channel selection in order to acquire a signal in the desired 2W-wide information band.

Signal Amplification

Another major function of an RF receiver can be signal amplification. Consider an 8-bit ADC receiving an input signal with peak-to-peak voltage of 600 mV [Nat'l Semi. Corp., DS200681, 2004, op. cit.]. An associated quantization step can be 2.34 mV. The quantization noise power assuming a 50-Ohm load can be expressed $$N_q^{dB} = 10\log_{10}\left[2 \times \frac{(2.34 \times 10^{-3})^2}{12} \frac{10^3}{50}\right] \approx -47 dBm \qquad (18)$$

where a factor of 2 results from considering the total quantization noise power of the in-phase (I) and quadrature (Q) ADCs in the system.

Figure 5:
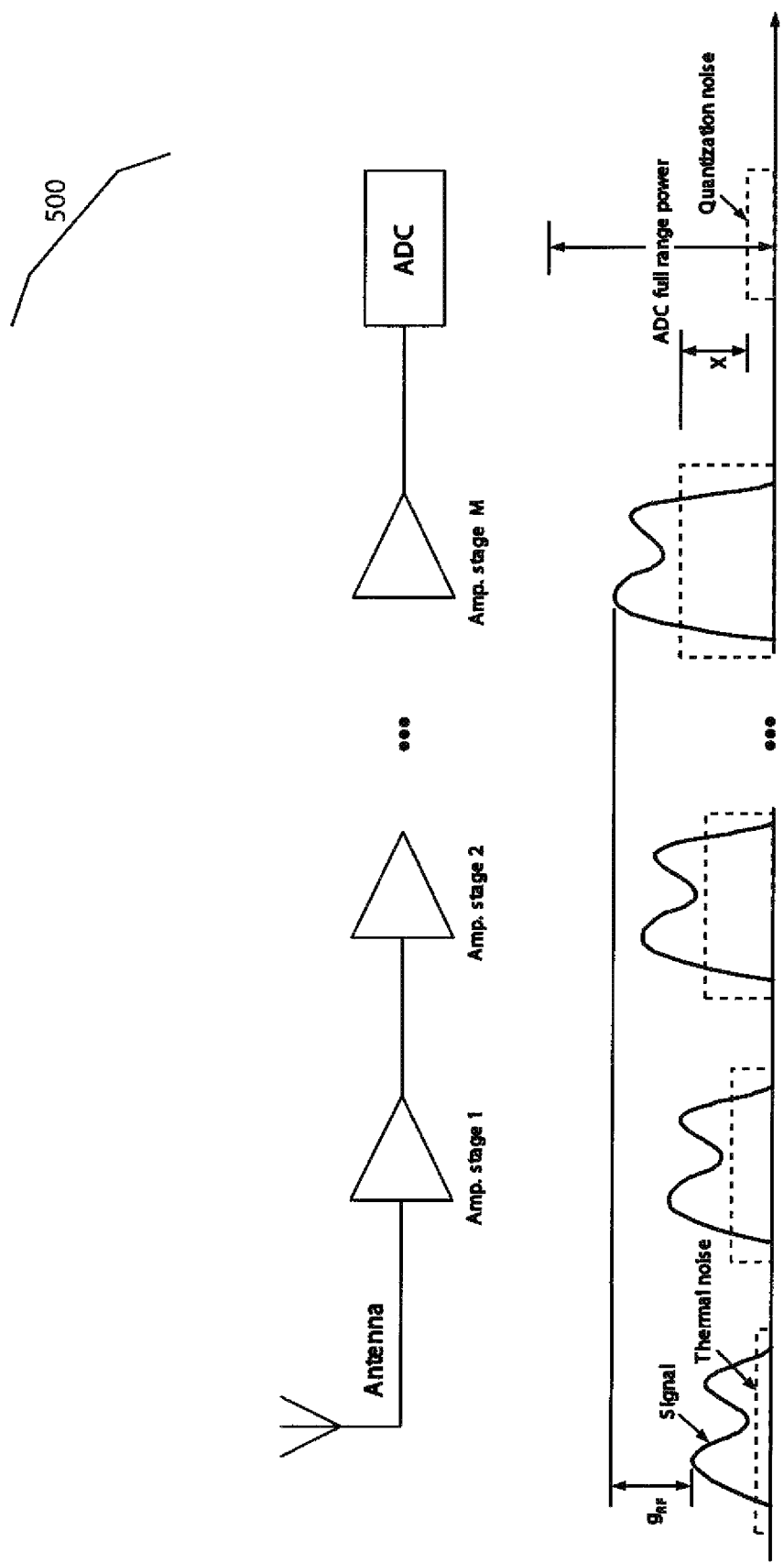
FIG. 5 diagram: amplification stages between antenna and ADC

In some embodiments a received signal power level at the antenna can be small, e.g. close to the exemplary thermal noise level of −89 dBm in Equation (1). As illustrated in diagram 500 (FIG. 5), significant amplification through multiple amplification stages along the RF chain can be provided in some embodiments to ensure that a signal has enough power to overcome a quantization noise floor when the signal reaches an ADC input. In some embodiments, a specification can be employed to ensure that quantization noise has a negligible impact on the system performance; require that at the ADC input, the total thermal noise (amplified thermal noise plus RF chain noise figure) is at least $X^{dB}$ (e.g. 10 dB) above the quantization noise level. This specification can translate into a requirement on the total RF chain power gain $g_{RF}$:

$$g_{RF}^{dB} - 89 \text{ dBm} + F_{RF}^{dB} \geq -47 \text{ dBm} + X^{dB} \qquad (19)$$

where $F_{RF}$ is the RF chain noise figure. Alternatively, this relationship can be expressed $$g_{RF}^{dB} \geq 42 - F_{RF}^{dB} + X^{dB} \qquad (20)$$

As an example, consider a receiver with a noise figure of 6 dB and $X^{dB}=10$ dB. The total gain provided by the RF chain needs to be at least 46 dB according to the above equation. Accomplishing this gain can be a non-trivial task.

Receiver Architecture Choices Based on Channel Selection Considerations

Since each exemplary 6 MHz TV channel can carry dissimilar information content, in some embodiments channel selection can be employed to decode the information content of a particular channel, such as a TV channel. Channel selection can be performed at one or more of an RF stage, IF stage, analog baseband, digital baseband, and/or a combination of these stages.

RF Channel Selection:

In one design scenario, a channel selection filter can be disposed in the RF stage immediately following the antenna in order to select the desired channel. Several problems can attend this approach. First, a high quality channel selection filter can present challenges to realization at specified RF frequencies. A quality metric for a filter can be defined as approximately its 3-dB bandwidth divided by its center frequency. For a specified fixed channel width, a corresponding quality metric value increases with increasing frequency. Hence, challenges to realizing such a filter can increase with frequency. In some embodiments a receiver can be specified to select any one of 55 TV channels from an exemplary TV band. Thus in some embodiments, a tunable RF channel selection filter can be employed, thereby further exacerbating realization challenges. In some application embodiments, a capability of simultaneous decoding multiple (eg., TV) channels can be specified. In some such embodiments a complete RF chain after a RF channel selection filter could be replicated for each additional channel, and can thereby increase cost and/or complexity of a realizable embodiment.

Heterodyne Receiver:

Diagram 600 depicts a block diagram embodiment of a heterodyne receiver.

Channel selection in some embodiments of a conventional heterodyne receiver can be achieved through a combination of filtering stages along a RF (radio frequency) chain, which are herein described:

An RF filter 604, also called a band selection filter. In some embodiments this can be an RF frequency filter connected directly to and/or coupled with an antenna 602. An RF filter 604 can select a frequency band of interest, such as an entire exemplary TV band, and can reject signals outside the frequency band of interest, e.g. 900 MHz cellular signals.

An Image rejection (IR) filter 612. In some embodiments this filter can be disposed prior to a RF mixer 614 in order to reject one or more image signals. In some embodiments an image signal can otherwise fold into a desired signal band after mixing [B. Razavi, *RF Microelectronics*. Pearson-Prentice Hall, 1998].

An IF filter 616, also called a channel selection filter. In some embodiments this filter can be primarily responsible for channel selection. In some embodiments an IF filter 616 can be realized as a standalone component, e.g. a surface acoustic wave (SAW) filter [C. Marshall and et al., "2.7 v GSM transceiver ICs with on-chip filtering," *ISSCC Digest of Technical Papers*, pp. 148-149, February 1995].

One or more baseband filters 624 634, also called anti-aliasing filters. A baseband filter can be disposed prior to an analog to digital converter (ADC) in order to reject alias signals that can result from sampling. Diagram 600 depicts baseband filter 624 employed in combination with ADC 628, and baseband filter 634 employed in combination with ADC 638, corresponding respectively to I and Q signal paths of a receiver embodiment.

In some embodiments, with the exception of a band selection (RF) filter 604, each of the filters just described can provide a degree of channel selection. In some embodiments a channel selection (IF) filter 616 can be capable of providing the largest contribution to selectivity. In some embodiments a heterodyne receiver architecture can be relatively complex and/or costly if multiple channels are to be decoded simultaneously. In some embodiments, an RF chain comprising the elements after the IR filter can be replicated for each additional channel in order to support simultaneous decoding of multiple channels.

RF filter 604 can receive a signal from antenna 602. RF filter 604 can provide a filtering function to a received signal. Low noise amplifier LNA 610 can be coupled with and receive a filtered signal from RF filter 601.

LNA 610 can provide a gain function with low noise to a received signal. IR filter 612 can be coupled with and receive a gain-modified signal from LNA 610. IR filter 612 can provide a filtering function to a received signal. Oscillator $LO_1$ 608 can provide a signal that can be a tone signal at a specified frequency. RF mixer 614 can be coupled with and receive a filtered signal from IR filter 612. RF mixer 614 can be coupled with and receive a signal that can be a tone signal at a specified frequency from oscillator $LO_1$ 608. RF mixer 614 can provide a mixing function, providing a signal responsive to a combination of a signal received from IR filter 612 and a signal received from oscillator $LO_1$ 608. IF filter 616 can be coupled with and receive a signal from RF mixer 614. IF filter 616 can provide a filtering function to a received signal. IF amp 618 can be coupled with and receive a filtered signal from IF filter 616. IF amp 618 can provide a gain function to a received signal.

Oscillator $LO_2$ 609 can provide a signal that can be a tone signal at a specified frequency. Quad splitter 623 can provide a quadrature splitting function to a received signal, thereby providing an in-phase (I) and a quadrature (Q) signal. Quad splitter 623 can be coupled with and receive a signal from Oscillator $LO_2$ 609. IF mixer 622 can be coupled with and receive a signal of a first specified phase from Quad splitter 623. IF mixer 622 can be coupled with and receive a gain-modified signal from IF amp 618. IF mixer 622 can provide a mixing function, providing a signal responsive to a signal received from Quad splitter 623 and responsive to a signal received from IF amp 618. Similarly, IF mixer 632 can provide a mixing function, providing a signal responsive to a signal of a second specified phase received from Quad splitter 623 and responsive to a signal received from IF amp 618. Each of the baseband filters 624 634 can provide a filtering function to a corresponding received signal. Baseband filter 624 can be coupled with and receive a signal from IF mixer 622. Baseband filter 634 can be coupled with and receive a signal from IF mixer 632. Each of the variable gain amplifiers (VGA) 626 636 can provide a variable gain to a corresponding received signal. VGA 626 can be coupled with and receive a filtered signal from baseband filter 624. VGA 636 can be coupled with and receive a filtered signal from baseband filter 634.

Each of the analog to digital converters (ADC) 628 628 can provide an analog to digital conversion function to a corresponding received analog signal. ADC 628 can be coupled with and receive a gain-modified signal from VGA 626. ADC 638 can be coupled with and receive a gain-modified signal from VGA 636. ADC 628 can provide a baseband digital output signal corresponding to the first specified phase (I). ADC 638 can provide a baseband digital output signal corresponding to the second specified phase (Q).

It can be appreciated that in alternative embodiments of a heterodyne receiver 600 and in other receiver and transmitter embodiments herein described, various gain elements can be omitted and/or their functions realized by any known and/or convenient method of providing signal gain.

Heterodyne Transceiver:

Diagram 700 depicts a block diagram embodiment of a heterodyne transceiver. An upper portion of diagram 700 corresponds directly to the heterodyne receiver 600 discussed herein. It can be appreciated that upon coupling antenna 702 to the receiver architecture through switch 706, there can be essentially a one-to-one correspondence between elements of the receiver 600 and elements of the receiver portion of the transceiver diagram 700.

The signal chain and function of the elements therein correspond directly and respectively between [Antenna 602, RF filter 604, $LO_1$ 608, $LO_2$ 609, LNA 610, IR filter 612, RF mixer 614, IF filter 616, IF amp 618, IF mixer 622, Quad splitter 623, Baseband filter 624, VGA 626, ADC 628, IF mixer 632, Baseband filter 634, VGA 636, ADC 638] and [Antenna 702, RF filter 704, $LO_1$ 708, $LO_2$ 709, LNA 710, IR filter 712, RF mixer 714, IF filter 716, IF amp 718, IF mixer 722, Quad splitter 723, Baseband filter 724, VGA 726, ADC 728, IF mixer 732, Baseband filter 734, VGA 736, ADC 738].

The receiver portion of diagram 700 further comprises a Splitter 720 that couples elements with each other: IF amp 718, IF mixer 722, and IF mixer 732. Corresponding elements IF amp 618, IF mixer 622, and IF mixer 632 can be similarly coupled in the embodiment of diagram 600.

In some embodiments the transmitter portion of diagram 700 can be advantageously realized using design analysis and/or frequencies and/or element specifications and/or particular elements in common with the receiver portion. In some embodiments elements RF filter 704, $LO_1$ 708, and $LO_2$ 709 can be used in common.

In some embodiments, elements of the transmitter [IR filter 712, RF mixer 714, IF filter 716, IF amp 718, Splitter 720, IF mixer 722, Quad splitter 723, Baseband filter 724, VGA 726, IF mixer 732, Baseband filter 734, VGA 736] can be substantially similar to the corresponding and respective elements of the receiver [IR filter 762, RF mixer 764, IF filter 766, IF amp 768, Splitter 770, IF mixer 772, Quad splitter 773, Baseband filter 774, VGA 776, IF mixer 782, Baseband filter 784, VGA 786].

Each of the digital to analog converters DAC 778 788 can provide a digital to analog conversion function to a corresponding received digital signal, thereby providing corresponding converted corresponding analog signals. Baseband filters 774 784 can each provide a filter function to a corresponding received signal. Baseband filter 774 can be coupled with and receive an analog signal from DAC 778. Baseband filter 784 can be coupled with and receive an analog signal form DAC 788.

Oscillator $LO_2$ 709 can provide a signal that can be a tone signal at a specified frequency. Quad splitter 773 can provide a quadrature splitting function to a received signal, thereby providing an in-phase (I) and a quadrature (Q) signal. Quad splitter 773 can be coupled with and receive a signal from Oscillator $LO_2$ 709. IF mixer 772 can be coupled with and receive a signal of a first specified phase from Quad splitter 773. IF mixer 772 can be coupled with and receive a filtered signal from baseband filter 774. IF mixer 772 can provide a mixing function, providing a signal responsive to a signal received from Quad splitter 773 and responsive to a signal received from Baseband filter 774. Similarly, IF mixer 782 can provide a mixing function, providing a signal responsive to a signal of a second specified phase received from Quad splitter 773 and responsive to a signal received from Baseband filter 784.

Combiner 770 can provide a combining function, providing a signal responsive to the combination of two received signals. Combiner 770 can be coupled with and receive a signal corresponding to a first specified phase from IF mixer 772. Combiner 770 can be coupled with and receive a signal corresponding to a second specified phase from IF mixer 782. IF amp 778 can provide a gain function to a received signal. IF amp can be coupled with and receive a combined signal from Combiner 770. IF filter can provide a filter function to a received signal. IF filter can be coupled with and receive a gain-modified signal from IF amp 778.

$LO_1$ 708 can provide a signal that can be a tone signal at a specified frequency. RF mixer 764 can be coupled with and receive a filtered signal from IF filter 766. RF mixer 764 can be coupled with and receive a signal that can be a tone signal at a specified frequency from $LO_1$ 708. RF mixer 764 can provide a mixing function, providing a signal responsive to a combination of a signal received from IF filter 766 and a signal received from $LO_1$ 708. IR filter 762 can provide a filter function to a received signal. IR filter 762 can be coupled with and receive a mixed signal from RF mixer 764. PA 760 can provide a power amplification function to a received signal. PA 760 can be coupled with and receive a filtered signal from IR filter 762. RF filter 704 can provide a filter function to a received signal. RF filter can be coupled with and receive a signal from PA 760 via Switch 706. Switch 706 can selectably couple PA 760 with RF filter 704. Antenna 702 can provide an antenna transmission function to a power amplified signal received from PA 760.

Wideband Direct-conversion Receiver:

From the above discussion, it can be appreciated that as long as the channel selection starts from a particular RF stage, in some embodiments the RF chain from that stage onward can be replicated for each additional channel. In some embodiments it can be advantageous to defer channel selection all the way until the digital baseband. Such an embodiment can comprise a receiver that is capable of simultaneously decoding all of the channels in one or more specified bands, such as all of the TV channels in depicted in the graph 200. Two issues can be addressed in such a system.

First, there can be a need to have fast and high-resolution sampling, because an ADC in such an embodiment sees an entire band of interest, such as a TV band (Channels 14-69) with 336 MHz of bandwidth.

Second, because before channel selection, the overall signal consists of the signals from all the channels, some of which can be strong while some of which can be weak, RF component nonlinearities can cause signal intermodulations between one or more channels and thus degrade system performance for the weak channels. Linearity requirements on RF components constituting embodiments of such an architecture can thus be relatively stringent, especially on components disposed near to the ADC because such components can be specified to operate on relatively high power signals and/or amplified input signals.

Current technology trends of digital scaling along with advances in high-speed ADCs can favor such an approach. An RF system design for embodiments of such a wideband direct-conversion receiver is herein described; diagram 800 depicts an embodiment. Such an architecture may be considered wideband because the RF receiver can operate on an entire band of interest, such as an entire TV band of 336 MHz bandwidth. In some embodiments, a system comprises a direct-conversion architecture wherein an RF signal can be directly down-converted to a baseband.

RF filter 804 can receive a signal from antenna 802. RF filter 804 can provide a filtering function to a received signal. Low noise amplifier LNA 806 can be coupled with and receive a filtered signal from RF filter 804. LNA 806 can provide a gain function with low noise to a received signal.

Oscillator LO 810 can provide a signal that can be a tone signal at a specified frequency. Quad splitter 808 can provide a quadrature splitting function to a received signal, thereby providing an in-phase (I) and a quadrature (Q) signal. Quad splitter 808 can be coupled with and receive a signal from LO 810. Mixer 820 can be coupled with and receive a signal of a first specified phase from Quad splitter 808. Mixer 820 can be coupled with and receive a gain-modified signal from LNA 806. Mixer 820 can provide a mixing function, providing a signal responsive to a signal received from Quad splitter 808 and responsive to a signal received from LNA 806. Similarly, Mixer 830 can provide a mixing function, providing a signal responsive to a signal of a second specified phase received from Quad splitter 808 and responsive to a signal received from LNA 806. Each of the Baseband filters 822 832 can provide a filtering function to a corresponding received signal.

Baseband filter 822 can be coupled with and receive a signal from Mixer 820. Baseband filter 830 can be coupled with and receive a signal from Mixer 830. Each of the variable gain amplifiers (VGA) 824 834 can provide a variable gain to a corresponding received signal. VGA 824 can be coupled with and receive a filtered signal from Baseband filter 822. VGA 834 can be coupled with and receive a filtered signal from baseband filter 832.

Each of the analog to digital converters (ADC) 826 836 can provide an analog to digital conversion function to a corresponding received analog signal. ADC 826 can be coupled with and receive a gain-modified signal from VGA 824. ADC 638 can be coupled with and receive a gain-modified signal from VGA 834. ADC 826 can provide a baseband digital output signal corresponding to the first specified phase (I). ADC 836 can provide a baseband digital output signal corresponding to the second specified phase (Q).

Receiver Chain Frequency Planning

System Frequency Planning:

Referring to the TV band diagram 200 in FIG. 2, consider a wideband direct-conversion receiver over the frequency range from 470 MHz to 806 MHz that can span TV channels 14-69. Since Channel 37 (608-614 MHz) is not used, the center frequency of Channel 37 can be employed as a direct-conversion carrier frequency, i.e.

$$f_c = 611 \text{ MHz} \tag{21}$$

A Nyquist bandwidth can be specified of $$2W = 400 \text{ MHz} \tag{22}$$

covering the RF signal frequencies from 411 MHz to 811 MHz. A number of alternative ADCs with 400 MHz sampling frequency and above can be used in an embodiment [National Semiconductor Corporation, ADC081000, 2004 op.cit.], [Maxim Integrated Products, MAX108, October 2001, op. cit.], [Analog Devices, Inc. "AD12401 Data Sheet, Rev A.", D05649-0-4/06(A), May 2006].

Frequency-Domain Effect of Second-Order Nonlinearity:

Referring to a signal path of the receiver block diagram 800: prior to the quadrature mixing stage comprising Mixer elements 820 830, there can typically be a plurality of amplification stages, e.g. low noise amplifier (LNA) and/or amplification within the mixers. In some embodiments, device nonlinearities in such amplification stages can cause spectral contamination. In order to ensure that frequency planning is adequate in the presence of such spectral contamination, consider an RF signal $$s_c(t) = r(t)\cos[2\pi f_c t + \theta(t)] \tag{23}$$

corresponding to a baseband signal $$s_B(t) = r(t)e^{j\theta(t)} \tag{24}$$

which is spectrally limited to $[-W, W]$. Taking into account device nonlinearity, the signal after the amplification stages can be expressed as $$y(t) \approx \alpha_0 + \alpha_1 r(t)\cos[2\pi f_c t + \theta(t)] + \tag{25}$$
$$\alpha_2 r^2(t)\cos^2[2\pi f_c t + \theta(t)] + \alpha_3 r^3(t)\cos^3[2\pi f_c t + \theta(t)]$$

where under the small-signal condition, only the second-order and third-order nonlinearities are retained. Third-order nonlinearity is neglected since in-band third-order interference is inevitable. However, to insure against in-band second-order interference, consider the second-order nonlinearity term $$\alpha_2 r^2(t)\cos^2[2\pi f_c t + \theta(t)] = \alpha_2 r^2(t)\frac{1}{4}\{e^{j[2\pi f_c t+\theta(t)]} + \quad (26)$$

$$e^{-j[2\pi f_c t+\theta(t)]}\}^2$$

$$= \frac{\alpha_2}{4}\left\{\underbrace{[s_B(t)]^2 e^{j2\pi(2f_c)t}}_{Center=2f_c} + \underbrace{[s_B^*(t)]^2 e^{j2\pi(-2f_c)t}}_{Center=-2f_c} + \right.$$

$$\left. ce2|s_B(t)|^2_{Center=DC}\right\}$$

Figure 9:
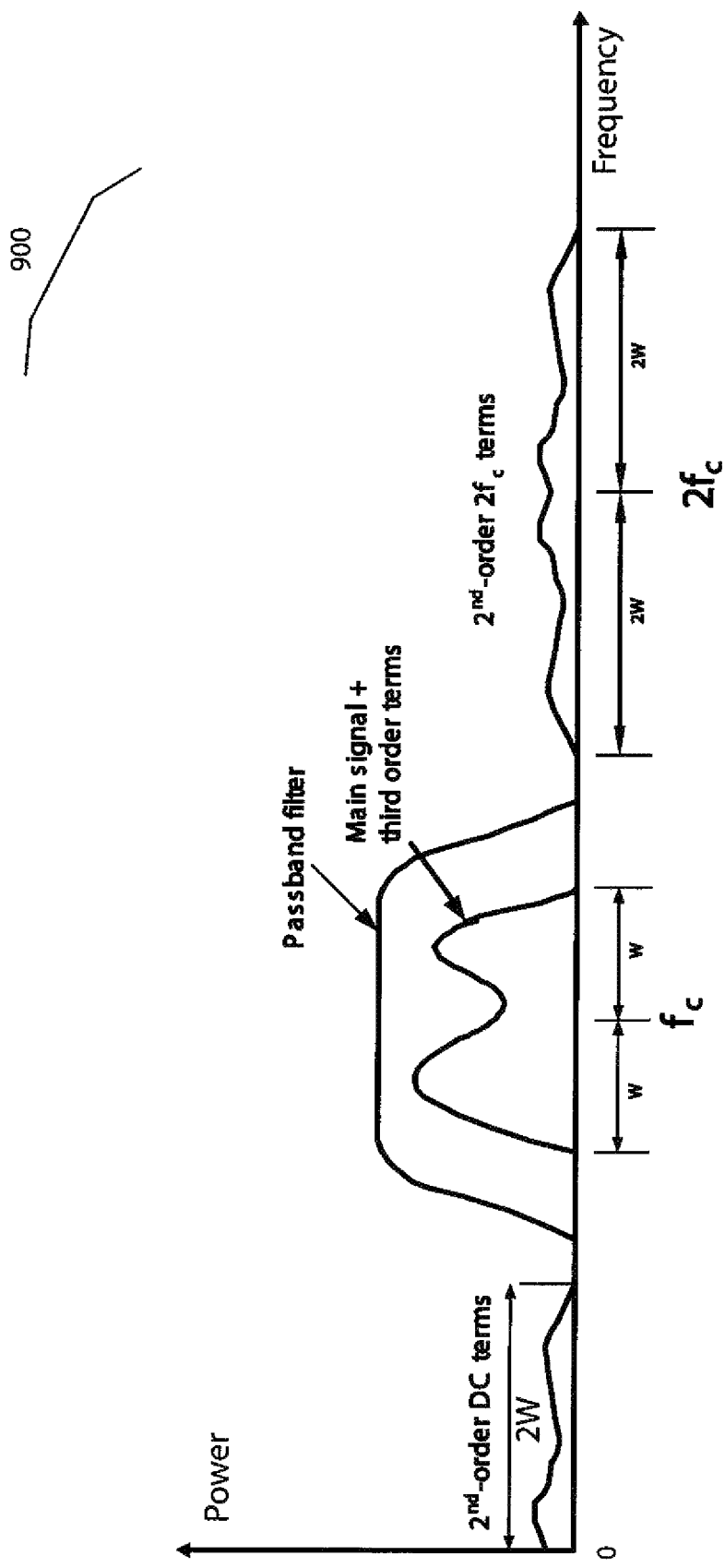
FIG. 9 graph: frequency-domain non-linear effect

Consider Fourier transform pairs $$s_B(t) \cdot s_B(t) \leftrightarrow S_B(f) \otimes S_B(f)$$

$$s_B(t) \cdot s_B^*(t) \leftrightarrow S_B^*(-f) \otimes S_B^*(-f)$$

$$s_B(t) \cdot s_B^*(t) \leftrightarrow S_B(f) \otimes S_B^*(-f) \quad (27)$$

and since $S_B(f)$ is spectrally limited to $[-W,W]$, all the above signal products (in the immediately preceding equations) can be spectrally limited to $[-2W,2W]$. The graph 900 of FIG. 9 illustrates the above nonlinear effect. It is clear from the illustration that as long as a carrier frequency $f_c$ satisfies $$f_c \geq 3W \quad (28)$$

a signal can be essentially free of second-order in-band interference. In some embodiments this condition can be satisfied by frequency planning, i.e.

$$611 \text{ MHz} = f_c > 3W = 600 \text{ MHz} \quad (29)$$

Other issues with direct-conversion architecture:

Although some embodiments of a direct-conversion architecture do not suffer an image problem as can some embodiments of a heterodyne architecture, there can remain a number of challenges to a practical implementation [B. Razavi, op. cit.]. In some embodiments, LO self-mixing can create a DC offset. In some embodiments, analog baseband circuitry can add considerable flicker noise—also called 1/f noise, since noise power can be proportional to 1/f. In some embodiments I/Q mismatch can occur if the I and Q signal paths are not precisely balanced. Challenges of DC offset and flicker noise—which can prominent around DC—can be addressed in some emboddiments of an improved receiver architecture by using an empty 6 MHz signal channel, such as Channel 37 of an exemplary TV band, at DC. In some embodiments, I/Q mismatch can be compensated through digital calibration techniques.

Receiver Chain Gain Planning

In light of frequency planning as discussed above, an ADC can be selected for an improved receiver embodiment. Consider using National Semiconductor's ADC 081000, an 8-bit 1 GHz ADC [Nat'l Semi. Corp., DS200681, 2004, op. cit.], as previously mentioned. A receiver chain amplification calculation can be as discussed herein regards Signal Amplification, and employed for each 6 MHz TV channel. Assuming ADC operation at a 800 MHz sampling frequency, a quantization noise per TV channel can be expressed $$n_q^{dB} = N_q^{dB} - 10 \log_{10}(800/6) \approx 68 \text{ dBm} \quad (30)$$

where $N_q$ is quantization noise power as calculated in Equation (18). In order to scale noise contributions, RF chain gain $g_{RF}$ can be specified such that thermal noise exceeds the quantization noise at the ADC. In other words, $$n_0^{dB} = F_{RF}^{dB} + g_{RF}^{dB} \geq n_q^{dB} + X^{dB} \quad (31)$$

Again a noise figure can be specified $F_{RF}^{dB}=6$ dB and a margin $X^{dB}=10$ dB so that $$g_{RF}^{dB} \geq n_q^{dB} + 4 - n_0^{dB} = 42 \text{ dB} \quad (32)$$

An ADC can be operating at twice a specified sampling rate of 400 MHz; this can account for the discrepancy between the result shown here and that in discussion regards Signal Amplification.

In some embodiments a receiver chain can provides 42 dB of amplification as just described. When operating with a maximum received signal power of −20 dBm, an amplified signal at an ADC can have a power level of $$P_{Signal} = 22 \text{ dBm} \quad (33)$$

Amplified thermal noise at the ADC can have a power level of −89+42+6=−41 dBm. In order to have third order intermodulation (IM3) power remain below thermal noise power, according to Equation (16), a required condition can be $$3P_{Signal}^{dB} - 2P_{IP3}^{dB} + \Gamma^{dB} = \quad (34)$$

$$P_{IM3} < -41 \Rightarrow P_{IP3}^{dB} > \frac{1}{2}(3P_{Signal}^{dB} + \Gamma^{dB} + 41) \Rightarrow$$

$$P_{IP3}^{dB} > \frac{1}{2}(3 \times 22 + 0 + 41) \Rightarrow P_{IP3}^{dB} > 53.5 dBm$$

where for simplicity, it can be assumed that $\Gamma^{dB}=0$. Such a high IP3 can be difficult to realize in an embodiment.

Another potentially complicating design consideration can be that a specified ADC has an input digitizing range of input (maximum) peak-to-peak 0.6V. A maximum input signal power for the I and Q ADCs can be computed as $$10\log_{10}\left(2 \times \frac{0.3^2}{50} \times 10^3\right) = 5.6 dBm, \quad (35)$$

far smaller than the amplified signal power of 22 dBm.

A Novel Double-ADC Receiver Architecture

Diagram 1100 depicts an embodiment in some detail comprising the double-ADC architecture of diagram 1000, and that can address some issues discussed herein; particularly challenges to realization of an embodiment. Some notable blocks are represented in diagram 1000. An Amplification Stage 1 1004 can comprise an LNA and/or optional additional amplifications. In one embodiment the total gain provided by this stage can be 15 dB (after 1-to-2 splitting) and a receiver chain noise figure up to this point can be 5 dB. Given an exemplary maximum receiver input signal power of −20 dBm, signal power at the output of this amplification stage can be −5 dBm.

Thermal noise power at the output of this amplification stage can be −89+15+5=−69 dBm. In order to maintain an IM3 power below the thermal noise floor, a specified IP3 of Amplification Stage 1 must be larger than $$-5 + \frac{-5 - (-69)}{2} = 27 dBm.$$

In some embodiments, a maximum component-wise IP3 in this amplification stage can be somewhat higher than 27 dBm in order to take into account losses through passive components, e.g. splitters and filters, in the stage.

A signal arriving at analog to digital converter ADC1 1006 can be representative of an input signal received by antenna 1002. A representative input signal can be expressed as $$y(t) = \sum_{k \in \Omega} x_k(t) e^{j2\pi f_k t} + n(t) \tag{36}$$

where $x_k(t)$ and $f_k$ are the baseband signal and frequency of a k th channel respectively. The signal after ADC1 1006 sampling can be expressed as $$y'(t) = \sum_{k \in \Omega} x_k(t) e^{j2\pi f_k t} + n(t) + q(t) \tag{37}$$

$$= \sum_{k \in \Omega} [x_k(t) + n_k(t) + q_k(t)] e^{j2\pi f_k t}$$

$$\approx \sum_{k \in \Omega} [x_k(t) + q_k(t)] e^{j2\pi f_k t}$$

where $q(t)$ is quantization noise; $n_k(t)$ and $q_k(t)$ are baseband equivalent thermal noise and quantization noise on Channel k; and in the approximation, thermal noise can be ignored because thermal noise power per channel can be approximately $-106+15+5=-86$ dBm; this can be far smaller than quantization noise power per channel, i.e. $-68$ dBm. The maximum input signal power to ADC1 1006, i.e. $E[|y(t)|^2]$, can be approximately $-20+15=-5$ dBm, which can be smaller than a maximum allowable ADC input signal power of 5.6 dBm.

In a baseband, digital filtering can be performed (by Digital Filtering element 1008) to select one or more specified channels. After filtering, a subset of the selected channels can be selected $\Lambda \subset \Omega$ whose SNRs exceed 25 dB. Element Digital Filtering 1008 can be adapted to provide this capability. A signal corresponding to the selected set of channels can be expressed as $$y_\Lambda(t) = \sum_{k \in \Lambda} [x_k(t) + q_k(t)] e^{j2\pi f_k t} \tag{38}$$

A signal $y_\Lambda(t)$ can be shown as $y_H(t)$ in some figures herein; the "H" subscript indicating correspondence to relatively high power channels of an input signal. Two operations can be employed with this set of channels. First, this set of channels can be sent to a digital baseband processing unit 1020 for decoding, since they have adequate SNRs. Second, an analog waveform can be reconstructed corresponding to the signal $y_\Lambda(t)$ using a DAC 1010. A reconstructed analog waveform can be expressed as $$y_\Lambda(t) = \sum_{k \in \Lambda} [x_k(t) + q_k(t)] e^{j2\pi f_k t} + p(t) \tag{39}$$

where $p(t)$ is quantization noise from the DAC 1010.

Figure 10:
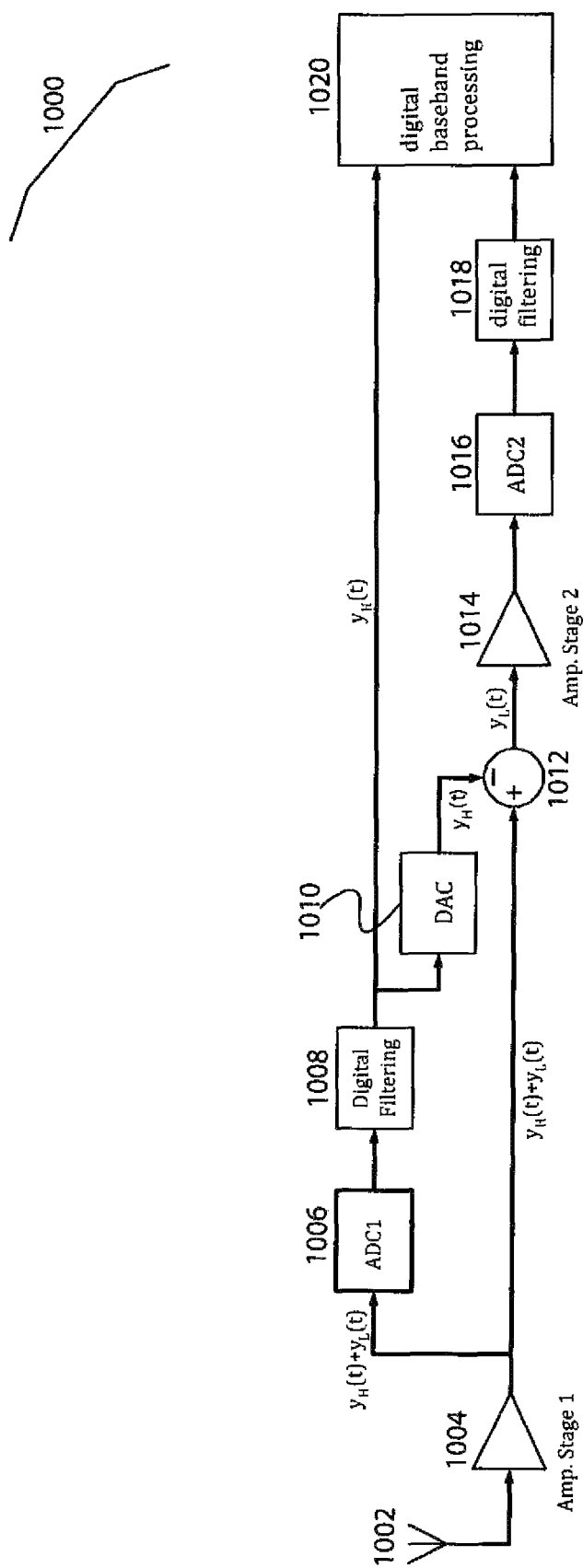
FIG. 10 diagram: double-ADC receiver architecture
Figure 11:
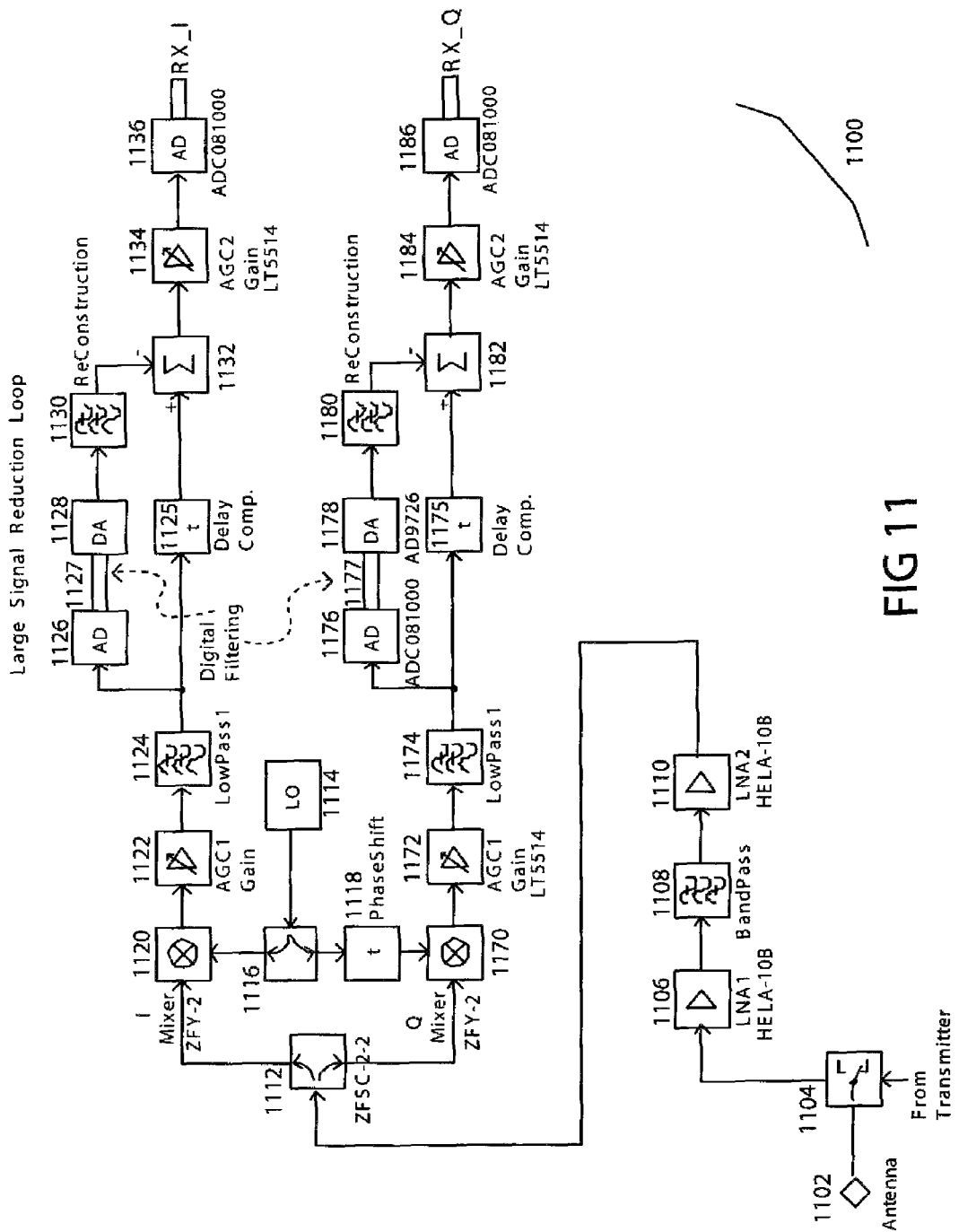
FIG. 11 diagram: double-ADC receiver architecture, detail

Subtracting a reconstructed waveform $y_\Lambda(t)$ from an original signal $y(t)$ can yield:

$$Y(t) - y_\Lambda(t) \sum_{k \in (\Omega - \Lambda)} x_k(t) e^{j2\pi f_k(t)} - \sum_{k \in \Lambda} q_k(t) e^{j2\pi f_k(t)} - p(t) + n(t) \tag{40}$$

and is depicted as a signal comprising $y_L(t)$ that can be provided by summing node 1012 in FIG. 10, wherein $y_L(t)$ corresponds to relatively low power channels of an input signal.

Since the remaining channels belong to a set $\Omega-\Lambda$, and these channels can have signal powers less than 25 dB above the an exemplary per channel quantization noise floor of $-68$ dBm, a maximum signal power per channel can be $-68+25=-43$ dBm. In an exemplary worst case, all of the channels can have signal powers at $-43$ dBm and $\Omega-\Lambda$ can comprise an exemplary complete set of 55 TV channels. A worst-case power of the signal $y(t)-y_\Lambda(t)$ then can be:

$$-43+10 \log_{10}(55) \approx -25 \text{ dBm} \tag{41}$$

In order to provide a total RF chain amplification of 42 dB with the first-stage amplification already providing 15 dB gain, the second-stage amplification 1014 can be required to provide an additional 27 dB gain. In the above worst case example, a signal power at input of ADC2 1016 (after second-stage amplification 1014) can be 2 dBm. Amplified thermal noise power at input of ADC2 1016 can be $-89+42+6=-41$ dBm. To maintain an IM3 below the thermal noise floor, an IP3 of $$2 + \frac{2(41)}{2} = 23.5 \text{ dBm}$$

for second amplification stage 1014 can be specified.

The summing node 1012 can provide a signal comprising specified relatively low-power bands and/or channels of a representative input signal but also comprising uncancelled residual signal attributed to specified relatively high-power bands and/or channels. Digital filtering 1018 can be adapted to substantially remove undesirable energy corresponding to specified bands and/or channels such as high-power channels corresponding to signal $y_H(t)$. Digital filtering 1018 can provide an advantageously filtered signal to digital baseband processing 1020. In some embodiments digital baseband processing 1020 can further process and/or decode such an advantageously filtered signal and can provide one or more individual channel signals corresponding to $y_L(t)$.

In order to prevent significant noise figure degradation, quantization noise $p(t)$ added by DAC 1010 can be kept small in comparison to thermal noise $n(t)$ in Equation (40). An exemplary DAC can provide up to 16-bit resolution at 500 MHz with an output peak-to-peak voltage swing of 1V. Examples of such DACs include Analog Devices AD9726 [Analog Devices, Inc., "AD9726 Data Sheet, Rev A", D04540-0-11/05(A), November 2005] and Maxim MAX5888 [Maxim Integrated Products, "MAX5888 Data Sheet: 3.3V, 16-Bit, 500 Msps High Dynamic Performance DAC with Differential LVDS Inputs", 19-2726; Rev 3; December 2003]. A quantization noise power for a 15-bit DAC can be expressed $$E[|p(t)^2|] = 10\log_{10}\left[2 \times \frac{(1/2^{15})^2}{12} \frac{10^3}{50}\right] \approx -85 \text{ dBm}, \quad (42)$$

which is less than a specified thermal noise floor of −89+15+5=−69 dBm.

Diagram 1100 shows in some detail a RF block diagram of an example direct-conversion double-ADC receiver. Many suitable components for an exemplary embodiment are identified herein, by way of non-limiting example.

The system of diagram 1100 comprises individual processing elements well known in the art and/or described herein. Each of these elements is generally identified herein with a name and/or abbreviation that corresponds to its well known and/or herein described function. Analog filters comprise BandPass 1108, Lowpass1 1124 1174, and ReConstruction 1130 1180. Digital filtering and/or other specified digital signal processing comprises Digital Filtering 1127 1177. Gain modifying elements comprise low noise amplifiers LNA1 1106 and LNA2 1110, automatic gain control AGC1 1122 1172 and AGC2 1134 1184. Analog to digital converters comprise AD 1126 1176 1136 1186. Digital to analog converters comprise DA 1128 1178.

Splitters comprise elements 1112 and 1116. Mixers comprise elements 1120 and 1170. Summing nodes comprise elements 1132 and 1182. Delay compensation elements comprise Delay Comp. 1125 1175.

Delay elements comprise Phase Shift 1118.

LNA1 1106 can be selectably coupled with Antenna 1102 via switch 1104. When so coupled, LNA1 1106 can receive a signal from Antenna 1102. BandPass 1108 can be coupled with and receive a signal from LNA1 1106. LNA2 can be coupled with and receive a signal from BandPass 1108.

Splitter 1112 can be coupled with and receive a signal from LNA2 1110. Mixer 1120 can be coupled with and receive a signal from Splitter 1112. Mixer 1120 can be coupled with and receive a signal from Splitter 1116.

Mixer 1170 can be coupled with and receive a signal from Splitter 1112. Mixer 1170 can be coupled with and receive a signal from PhaseShift 1118. PhaseShift 1118 can be coupled with and receive a signal from Splitter 1116. Splitter 1116 can be coupled with and receive a signal from an oscillator LO 1114.

AGC1 1122 can be coupled with and receive a signal from Mixer 1120.

Lowpass1 1124 can be coupled with and receive a signal from AGC1 1122.

Delay Comp. 1125 can be coupled with and receive a signal from Lowpass1 1124.

Summing node 1132 can be coupled with and receive a signal from Delay Comp. 1125.

AD 1126 can be coupled with and receive a signal from Lowpass1 1124.

Digital Filtering 1127 can be coupled with and receive a signal from AD 1126.

DA 1128 can be coupled with and receive a signal from Digital Filtering 1127.

ReConstruction 1130 can be coupled with and receive a signal from DA 1128.

Summing node 1132 can be coupled with and receive a signal from ReConstruction 1130.

AGC2 1134 can be coupled with and receive a signal from Summing node 1132.

AD 1136 can be coupled with and receive a signal from AGC2 1134.

AD 1136 can provide a baseband in-phase component signal.

AGC1 1172 can be coupled with and receive a signal from Mixer 1170.

Lowpass1 1174 can be coupled with and receive a signal from AGC1 1172.

Delay Comp. 1175 can be coupled with and receive a signal from Lowpass1 1174.

Summing node 1182 can be coupled with and receive a signal from Delay Comp. 1175.

AD 1176 can be coupled with and receive a signal from Lowpass1 1174.

Digital Filtering 1177 can be coupled with and receive a signal from AD 1176.

DA 1178 can be coupled with and receive a signal from Digital Filtering 1177.

ReConstruction 1180 can be coupled with and receive a signal from DA 1178.

Summing node 1182 can be coupled with and receive a signal from ReConstruction 1180.

AGC2 1184 can be coupled with and receive a signal from Summing node 1182.

AD 1186 can be coupled with and receive a signal from AGC2 1184.

AD 1186 can provide a baseband quadrature component signal.

Exemplary digital-analog conversion devices can be specified: National Semiconductor's ADC081000 [Nat'l Semi. Corp., DS200681, 2004, op. cit.], an 8-bit 1 GHz ADC, and Analog Devices' AD9726 [Analog Devices, Inc., D04540-0-11/05(A), November 2005, op. cit.], a 16-bit 600 MHz DAC. As shown in Diagram 1100, a first amplification stage comprises LNAs, bandpass filters, splitters, mixers, variable gain amplifiers, and lowpass filters, with a total gain of 15 dB and a noise figure of approximately 5 dB. Exemplary system components and a cascaded gain analysis are shown in the following table.

Note that because of losses due to the passive components, e.g. splitters and filters, in some embodiments one or more amplifiers can be needed in a first amplification stage. In some embodiments a second amplification stage can consist of variable gain amplifiers. An IP3 calculation for a second amplification stage can assume a maximum input signal power of −25 dBm, as discussed herein.

| Name | Vendor: Part | NF (dB) | Output NF (dB) | Gain (dB) | Max. output power (dBm) | IP3 (dBm) | DR (dB) |
|---|---|---|---|---|---|---|---|
| LNA1 | Mini-Circuits: HELA-10B | 3.5 | 3.5 | 12 | −8 | 47 | 110 |
| Bandpass | TBD | 3 | 3.6 | −3 | −11 | ∞ | ∞ |
| LNA2 | Mini-Circuits: HELA-10B | 3.5 | 3.9 | 12 | 1 | 47 | 92 |
| Splitter | Mini-Circuits: ZFSC-2-2 | 4 | 3.9 | −4 | −3 | ∞ | ∞ |
| Mixer | Mini-Circuits: ZFY-2 | 8 | 4.1 | −8 | −11 | 30 | 82 |
| AGC1 | Linear Tech: LT5514 | 7 | 4.9 | 14 | 3 | 47 | 88 |
| Lowpass1 | TBD | 8 | 4.9 | −8 | −5 | ∞ | ∞ |
| AGC2 | Linear Tech: LT5514 | 7 | 5.1 | 27 | 2 | 47 | 90 |

The above discussions and analysis show a wideband direct-conversion double-ADC receiver using exemplary hardware components can provide enabling system performance levels for embodiments of a TV-band cognitive radio system, and, can allow simultaneous decoding of essentially all of the TV channels in a designated spectrum.

A conventional single-channel heterodyne receiver can be considered as a reference and a cost-effective alternative to the embodiments above. A heterodyne receiver can use progressive filtering in an analog domain in order to improve channel selectivity. Although such a receiver may not have the capability of simultaneous decoding of multiple channels, neither does it require high-speed ADCs. It can also be instructive to compare the single-channel performance of the heterodyne receiver with that of the wideband receiver.

IP3 requirements for realizable embodiments of a double-ADC architecture can be relatively stringent. In some embodiments, the worst-case IM3 interference can be allowed to be higher than the thermal noise floor.

Remaining interference can then be removed in a digital domain through distortion compensation techniques.

A Reference Heterodyne Receiver Design

RF system design embodiments of a conventional single-channel heterodyne receiver can serve as a reference point and as an alternative to wideband direct-conversion receiver embodiments discussed herein.

Heterodyne Frequency Planning

Frequency planning for a heterodyne receiver can present further design challenges than that of a direct-conversion receiver. For some embodiments of a heterodyne receiver, two frequency translations can be required, i.e. from RF to IF and from IF to baseband (although frequency translation between IF and baseband can be achieved in some embodiments employing direct IF sampling and/or digital frequency synthesis). One of the key design issues of a heterodyne receiver embodiment can be specification of an intermediate frequency (IF).

IF Filtering:

As discussed herein regards Receiver Architecture Choices, a main purpose of an IF stage in a heterodyne receiver can be to provide channel selection filtering, because effective filtering can be more easily accomplished at a relatively low IF frequency than at a relatively high RF frequency. Availability of off-the-shelf IF filters can contribute to a practical selection and/or specification of an IF frequency.

A surface acoustic wave (SAW) filter can be a typical choice for IF channel selection. Some embodiments of exemplary commercially available SAW filters can have specified center frequencies of 40 MHz, 70 MHz, and 140 MHz [16, 17].

Figure 6:
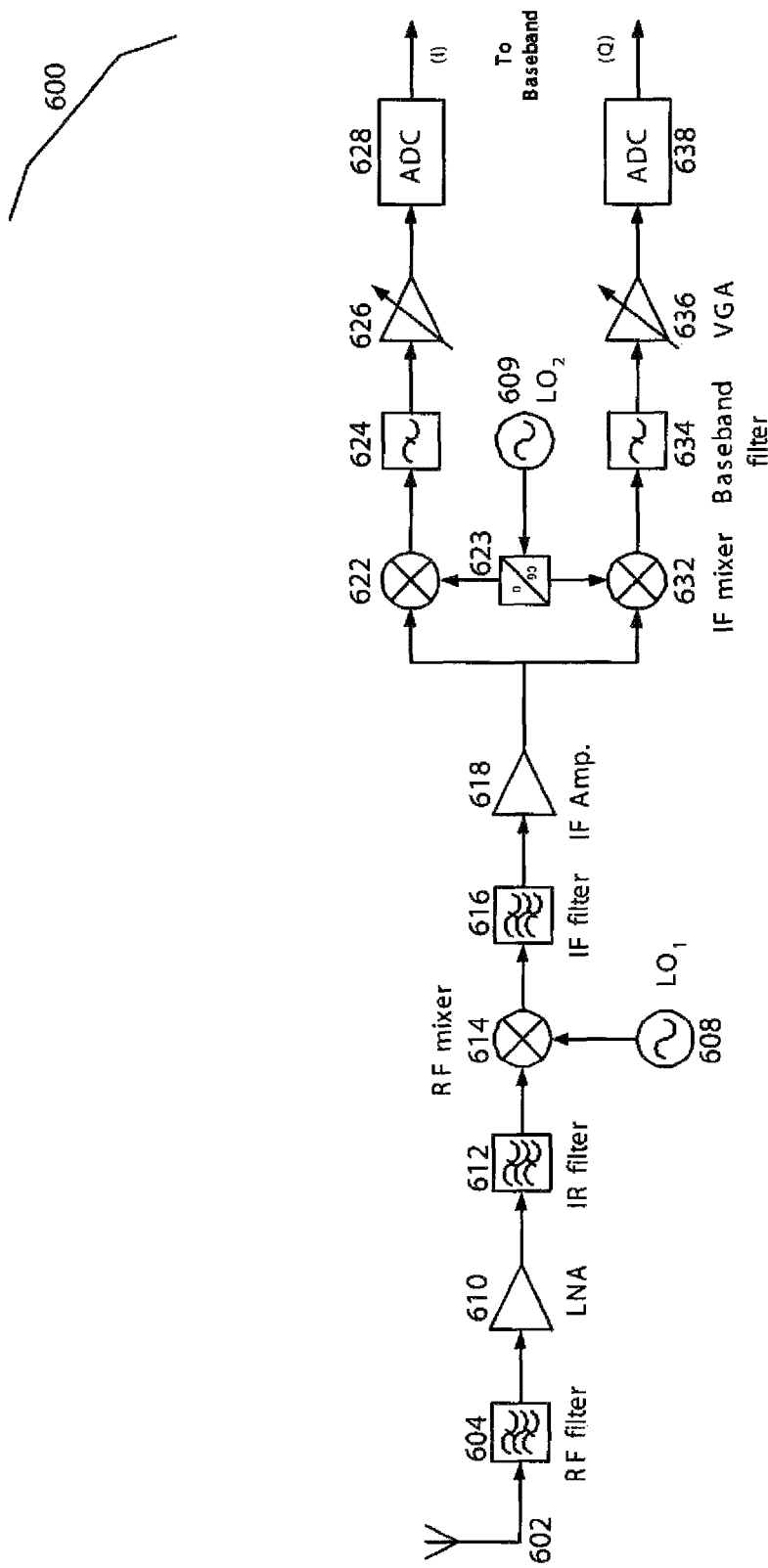
FIG. 6 diagram: heterodyne receiver
Figure 7:
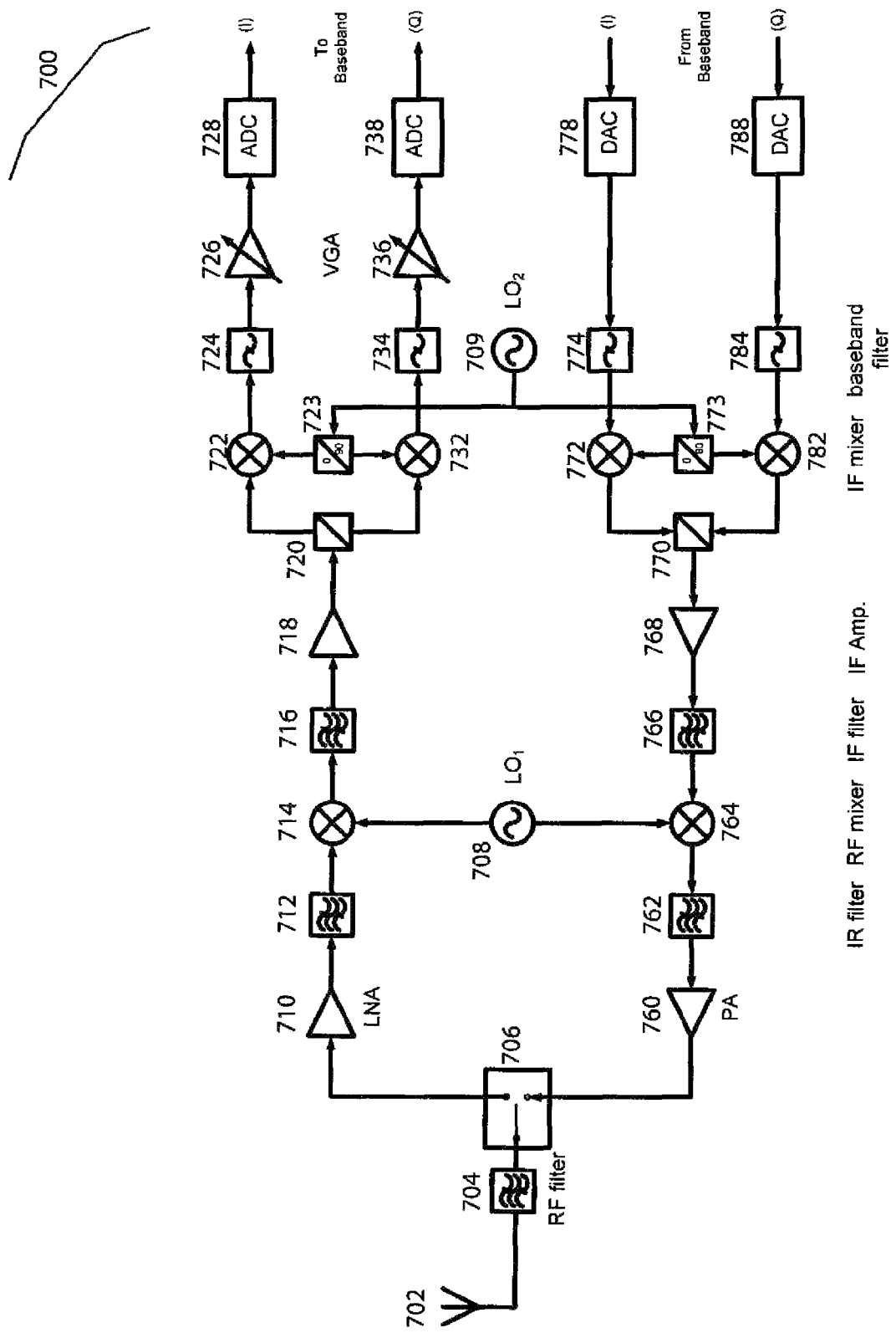
FIG. 7 diagram: heterodyne transceiver
Figure 8:
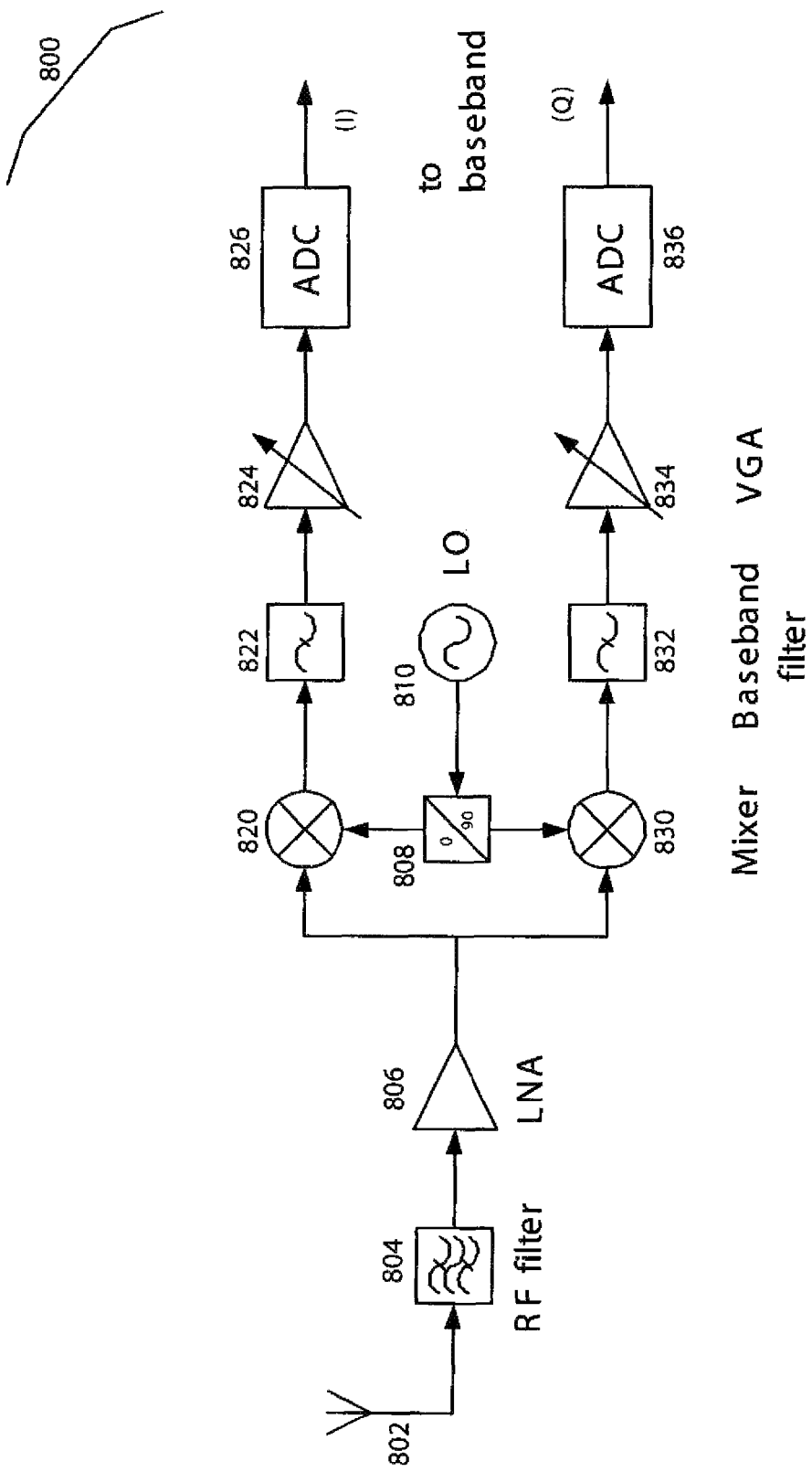
FIG. 8 diagram: wideband direct-conversion receiver
Figure 12:
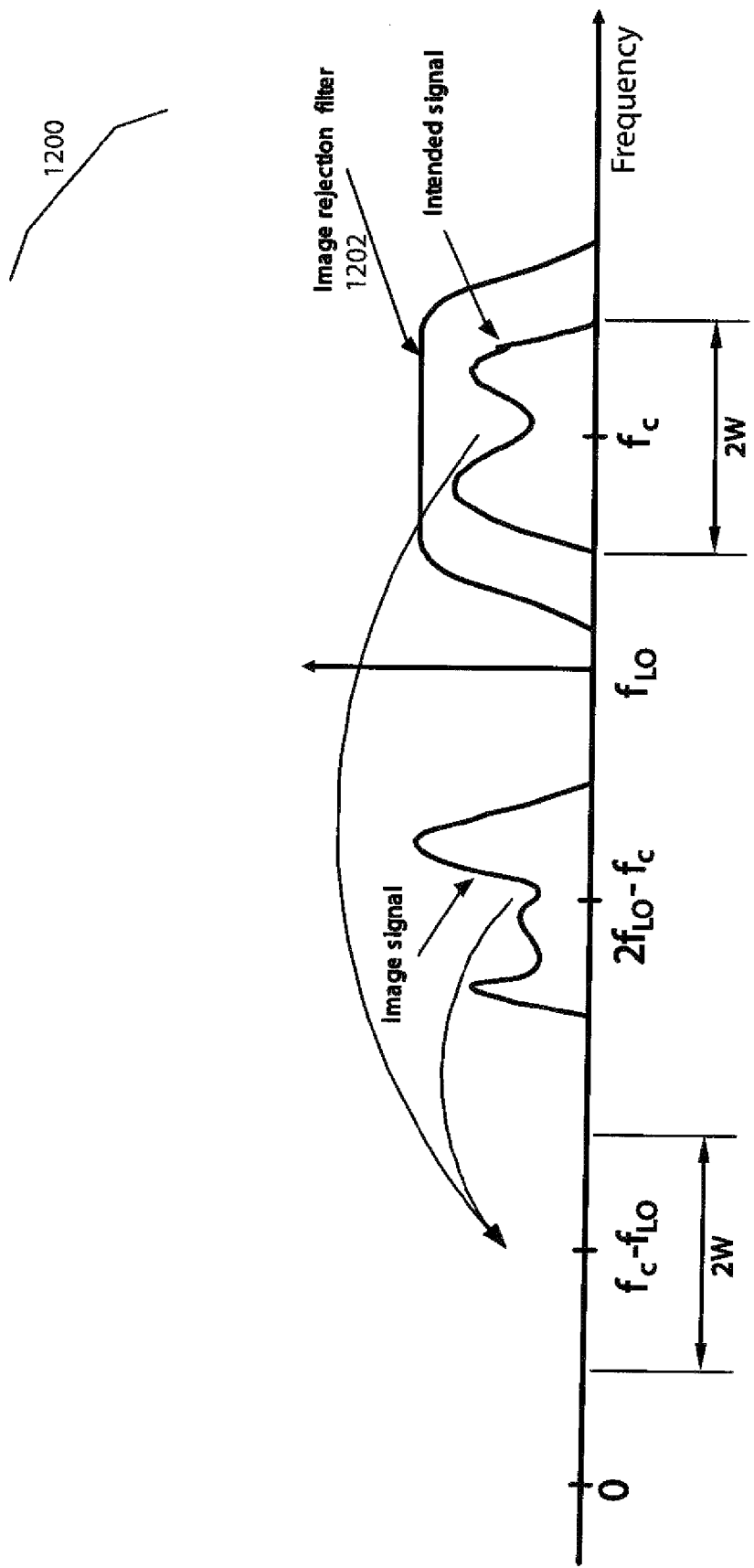
FIG. 12 graph: image problem, image rejection filter
Figure 13:
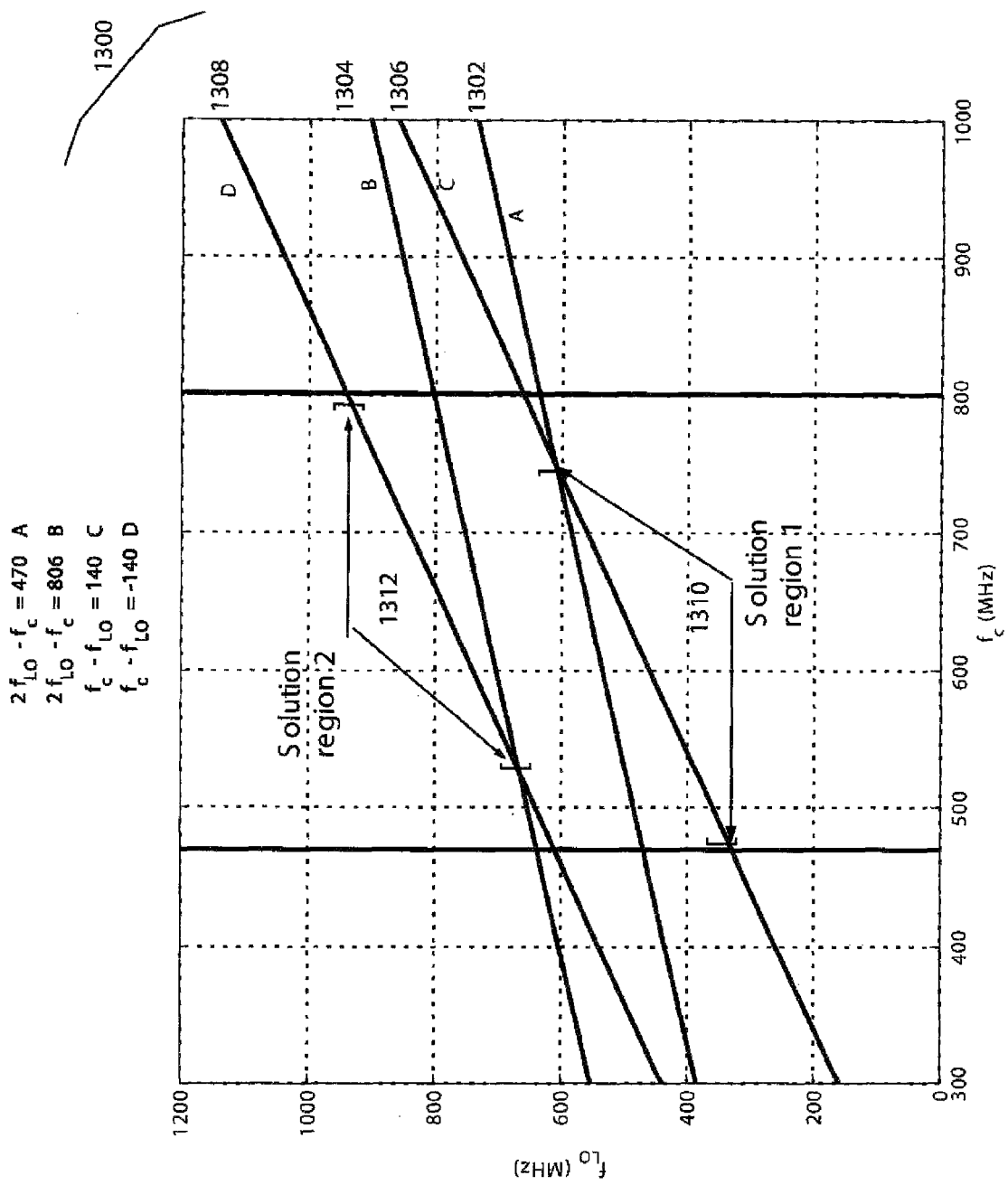
FIG. 13 graph: solution for LO freq. with specified IF freq. 140 MHz
Figure 14:
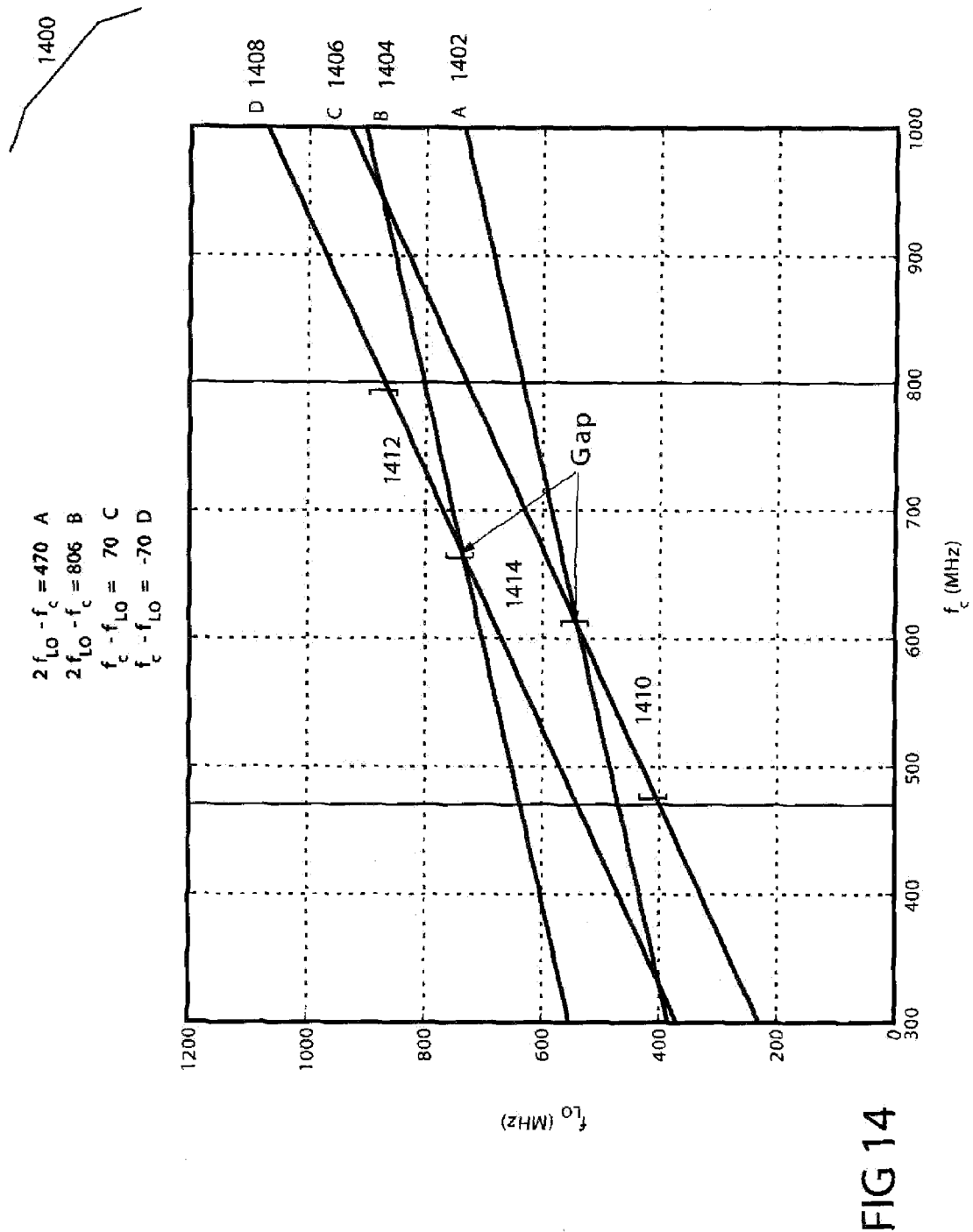
FIG. 14 graph: solution for LO freq. with specified IF freq. 70 MHz
Figure 15:
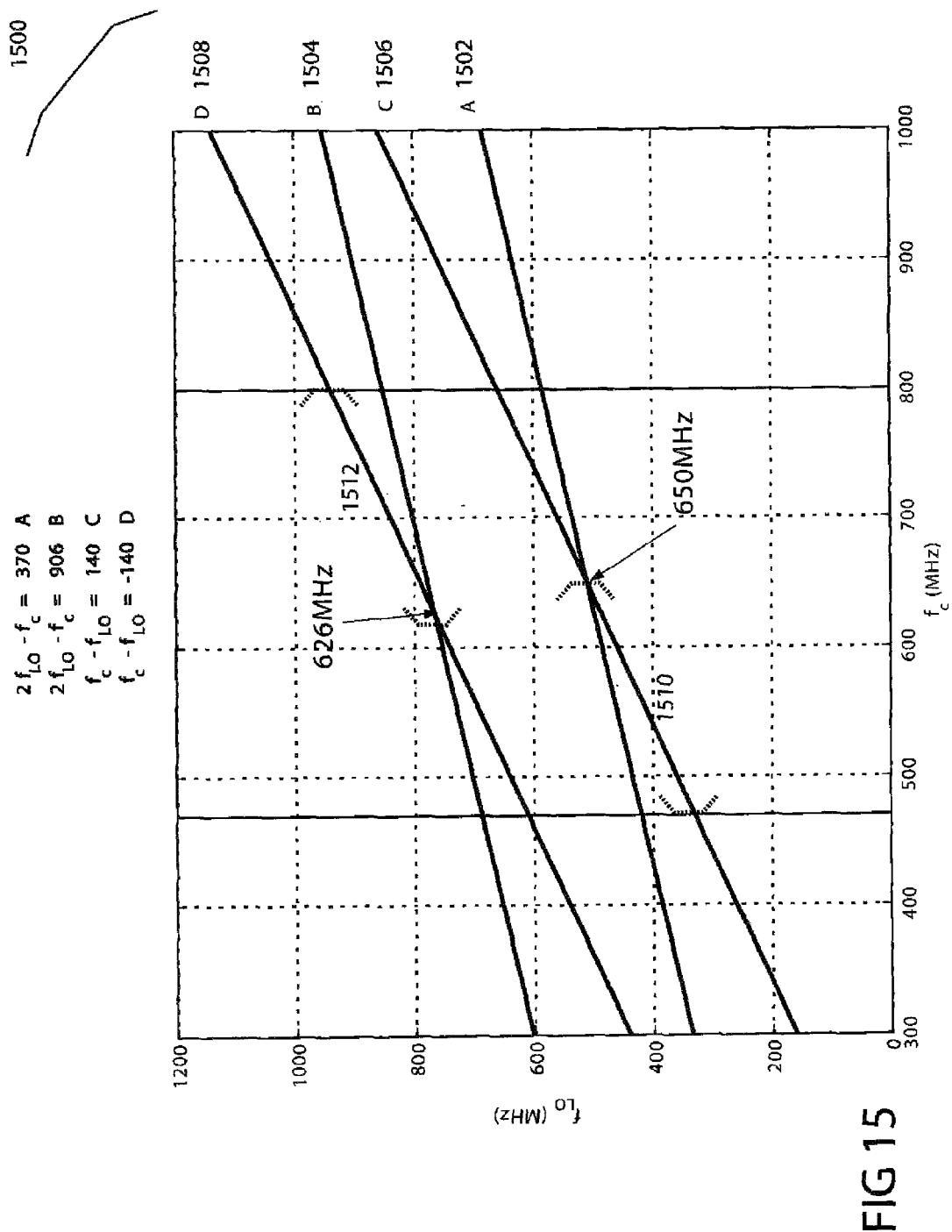
FIG. 15 graph: solution for LO freq. with specified IF freq. 140 MHz and specified rejection margin FIG. 16 graph: example SAW filter response FIG. 17 graph: example SAW filter rejection mask FIG. 18 graph: RF gain requirements FIG. 19 diagram: heterodyne receiver, single-channel FIG. 20 diagram: wideband direct-conversion transmitter FIG. 21 graph: DTV transmission mask FIG. 22 Diagram: wideband direct-conversion transmitter, detail FIG. 23 graph: simulated signal spectra for specified device non-linearities.

Image Rejection:

Referring to Diagram 600 of FIG. 6: Mixer 614 can be a second-order device, that is, a device that does not differentiate between positive and negative frequencies. Consequently, after mixing, a down-converted signal can contain both an intended signal and an image signal as illustrated in Diagram 1200 of FIG. 12.

Mathematically, an intended signal can be represented as $$R_s(t)\cos[2\pi f_c t + \phi_s(t)] \quad (43)$$

which can be band-limited to $[f_x-W, f_c+W]$; an image signal can be represented as $$R_i(t)\cos[2\pi f_i t + \phi_i(t)] \quad (44)$$

and mixing can use a tone signal $$\cos(2\pi f_{LO} t)$$

A mixing operation can be expressed as $$\{R_s(t)\cos[2\pi f_c t + \phi_s(t)] + R_i(t)\cos[2\pi f_i t + \phi_i(t)]\} \times \cos(2\pi f_{LO} t) = \quad (45)$$

$$\underbrace{\frac{1}{2}R_s(t)\cos[2\pi(f_c - f_{LO})t + \phi_s(t)]}_{1} +$$

$$\underbrace{\frac{1}{2}R_s(t)\cos[2\pi(f_c + f_{LO})t + \phi_s(t)]}_{2} +$$

$$\underbrace{\frac{1}{2}R_i(t)\cos[2\pi(f_i - f_{LO})t + \phi_i(t)]}_{3} + \underbrace{\frac{1}{2}R_i(t)\cos[2\pi(f_i + f_{LO})t + \phi_s(t)]}_{4}$$

A filtering operation $[f_c-f_{LO}-W, f_c-f_{LO}+W]$ can be applied to the signal after mixing, whereupon the second and fourth term in the above expression can essentially vanish. However, for an image signal at $$f_i=2f_{LO}-f_c \quad (46)$$

the third term above can become $$1/2R_i(t)\cos[2\pi(f_{LO}-f_c)t+\phi_i(t)]=1/2R_i(t)\cos[2\pi(f_c-f_{LO})t-\phi_i(t)] \quad (47)$$

In other words, this signal can be in the same band, i.e. $[f_c-f_{LO}-W, f_c-f_{LO}+W]$, as an intended signal after mixing (first term). One way to resolve the problem is to apply an image rejection (IR) filter 1202 before mixing as shown in the graph 1200 of FIG. 12 so that an image signal at $2f_{LO}-f_c$ can be rejected before a signal enters a mixer.

Frequency Planning:

For some embodiments, an intended signal can be in a specified band such as [470,806] MHz. An ideal image rejection filter can be a brick-wall filter around a specified band. Suppose such an ideal IR (image rejection) filter is used in an embodiment: essentially full pass in [470,806] MHz and essentially infinite rejection otherwise. $f_c$, $L_{LO}$, and $f_{IF}$ can be the carrier, LO, and IF frequencies, respectively. To have image-free mixing in some embodiments, the following conditions must be essentially met $$2f_{LO}-f_c<470 \text{ or } 2f_{LO}-f_c>806 \quad (48)$$

$$f_c-f_{LO}=+f_{IF} \text{ or } f_c-f_{LO}=-f_{IF} \quad (49)$$

Since $2f_{LO}-f_c$ is an image frequency, the first condition above can suggest that the image frequency must stay in a rejection band of an IR filter. The second condition can be expressed as $|f_c-f_{LO}|=f_{IF}$, where the absolute value is due to the properties of a realizable signal mixer.

Given IF frequency candidates of 40 MHz, 70 MHz, and 140 MHz, the three possible IF frequencies can be substituted in the above conditions and the systems solved for possible solutions. Solutions can be advantageously perceived graphically, as shown in graphs 1300, 1400, and 1500.

Graph 1300 corresponds to a condition ($f_{IF}$=140 MHz). Line A 1302 corresponds to ($2f_{LO}-f_c$=470). Line B 1304 corresponds to ($2f_{LO}-f_c$=806). Line C 1306 corresponds to ($f_c-f_{LO}$=140). Line D 1308 corresponds to ($f_c-f_{LO}$=-140).

A portion of line C 1306 shown in a region below line A 1302 (corresponding to ($2f_{LO}-f_c$<470)) can be part of a solution, and, a portion of line D 1308 shown in a region above line B 1304 (corresponding to ($2f_{LO}-f_c$>806)) can also be part of a solution. By way of non-limiting example, $f_c$=500 MHz is shown to be in Solution Region_1 1310 and with an $f_{LO}$=360 MHz, an image is thereby at 220 MHz and within a rejection region of the IR filter. Since each solution region can cover a part of the input signal frequency range (e.g. Solution Region_1 1310 can cover 750 MHz and below and Solution Region_2 1312 can cover 543 MHz and above), both regions can be necessary for an embodiment comprising an entire exemplary input frequency range, i.e. [470,806] MHz. Thus the constraints of Graph 1300 can lead to a practical realization for single-stage image-free IF mixing in some embodiments.

Graph 1400 corresponds to a condition ($f_{IF}$=70 MHz). Line A 1402 corresponds to ($2f_{LO}$-$f_c$=470). Line B 1404 corresponds to ($2f_{LO}$-$f_c$=806). Line C 1406 corresponds to ($f_c$-$f_{LO}$=70). Line D 1308 corresponds to ($f_c$-$f_{LO}$=-70).

Graph 1400 shows a Gap 1414 between solution regions 1410 1412, corresponding to a region wherein image-free mixing can not occur in some embodiments. For the constraints corresponding to graph 1400, some embodiments employing 70 MHz IF filters for single-stage image-free IF mixing can fail to provide a solution for an entire exemplary TV band [470,806] MHz.

A similar analysis can show that some embodiments employing 40 MHz IF filters under such constraints can fail to provide a solution covering an entire exemplary TV band [470,806] MHz.

The conditions for Graph 1300 and Graph 1400 correspond to an ideal brick-wall IR filter over the signal band. In practice, typical filter embodiments can have gradual edge roll-offs. Thus in some embodiments margins can be employed at IR filter edges in order to provide a specified level of image rejection. By way of non-limiting example, a 100-MHz margin can be added to each side of an IR filter in order to account for edge roll-offs. An image rejection region can then be $$2f_{LO}-f_c<370 \text{ and } 2f_{LO}-f_c>906 \tag{50}$$

Graph 1500 shows a solution for the conditions discussed. Line A 1502 corresponds to ($2f_{LO}$-$f_c$=370). Line B 1504 corresponds to ($2f_{LO}$-$f_c$=906). Line C 1506 corresponds to ($f_c$-$f_{LO}$=140). Line D 1508 corresponds to ($f_c$-$f_{LO}$=-140).

An advantageous overlap between Solution Region_1 1510 and Solution Region_2 1512 can be relatively smaller than the overlap shown in Graph 1300. By way of non-limiting example, 650 MHz can be a cutoff frequency. For exemplary TV channels 14 (center 473 MHz) to 43 (center 647 MHz), an LO frequency can be $$f_{LO}=f_c-140 \tag{51}$$

and for exemplary TV channels 44 (center 653 MHz) to 69 (center 803 MHz), an LO frequency can be $$f_{LO}=f_c+140 \tag{52}$$

Gain Planning

Figure 16:
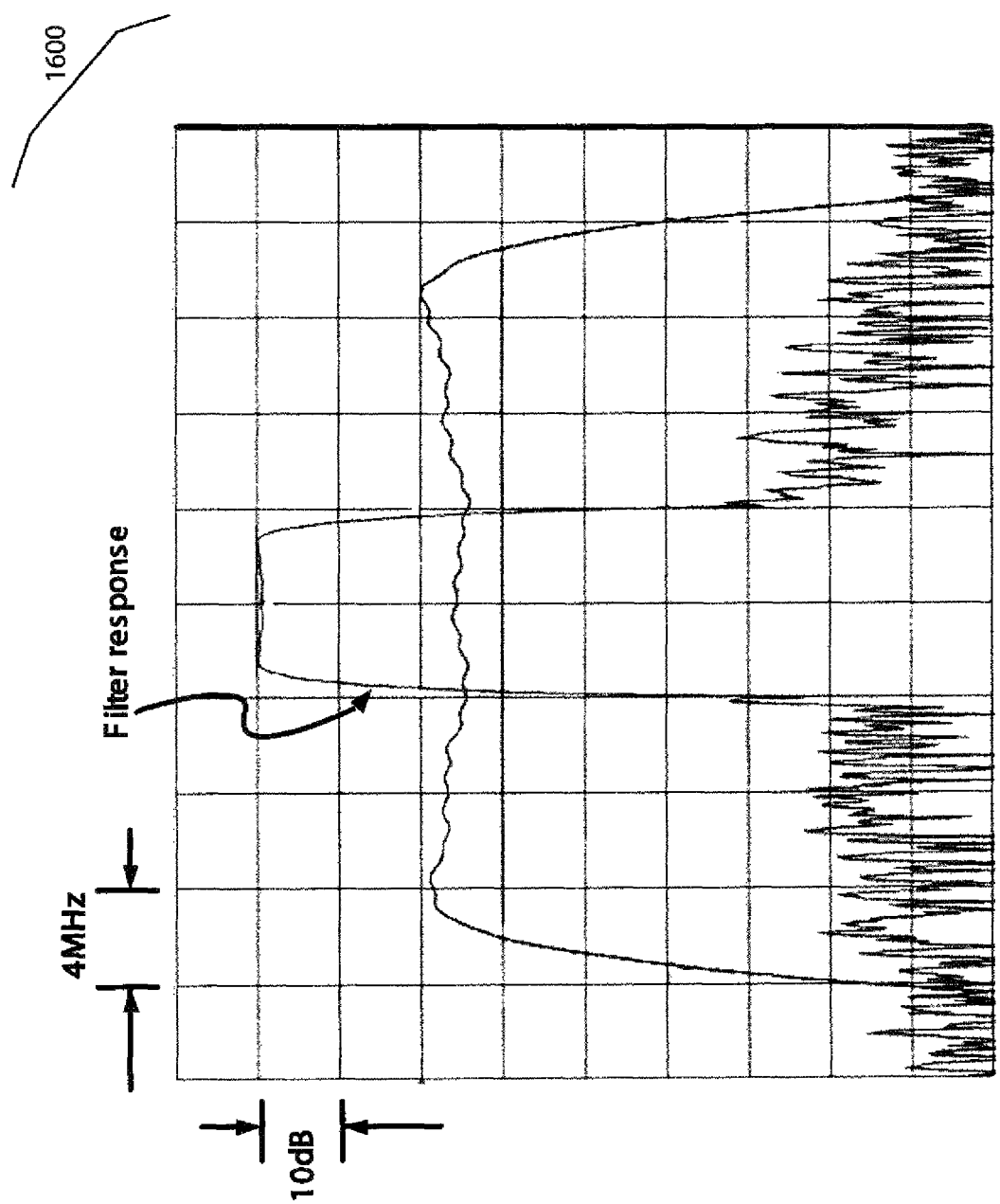

Graph 1600 of FIG. 16 depicts the response of an exemplary SAW filter [Vectron International, "Surface Acoustic Wave (SAW) Products" http://www.vectron.com/products/saw/saw.htm]. The filter has a specified passband of approximately 6 MHz. The specified rejection for two 6 MHz channels adjacent to the pass band can be specified as at least 15 dB (due to the finite roll-offs at filter edges as shown in the figure). Specified rejection for the channels not adjacent to the pass band can be at least 50 dB. The filter has a specified insertion loss of 22.5 dB.

Figure 17:
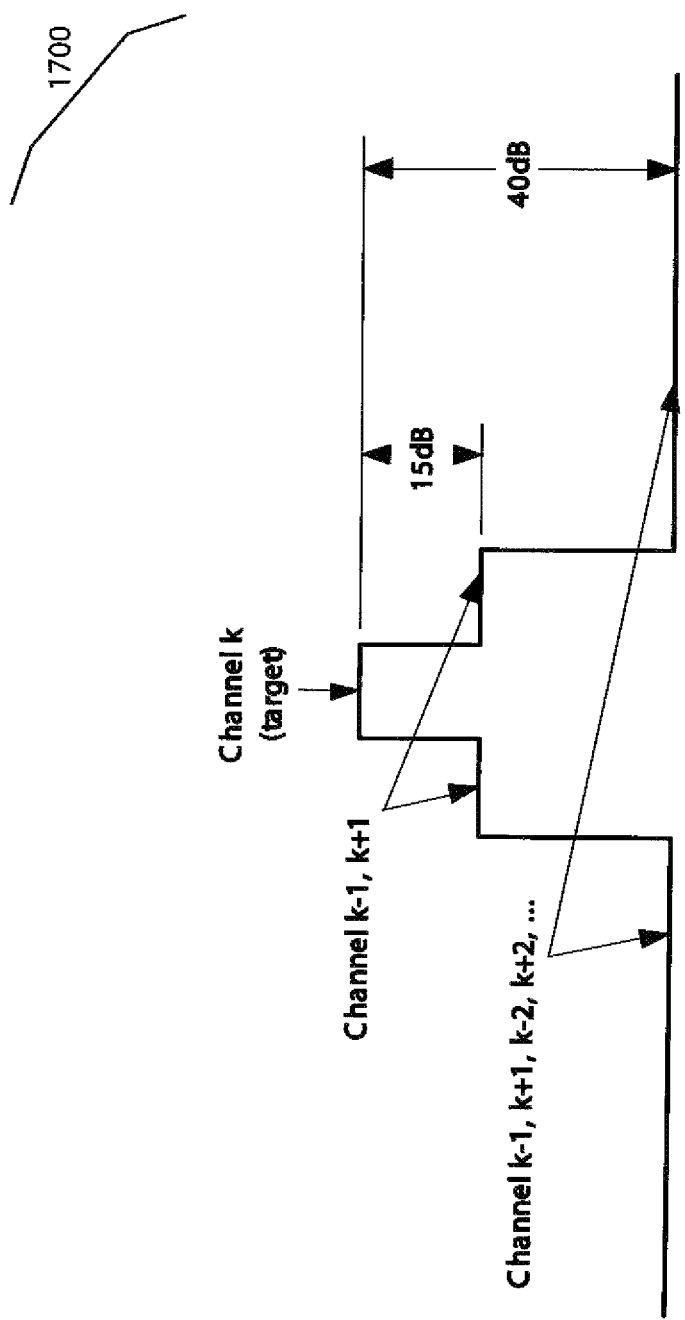

A SAW filter channel rejection mask as shown in FIG. 17 can be assumed. A target channel k has 0 dB rejection. Rejection for adjacent channels k±1 is specified as 15 dB. Rejection for all other channels is specified as 40 dB. Some embodiments of SAW filters are able to essentially meet the specified requirements of such a rejection mask.

Figure 18:
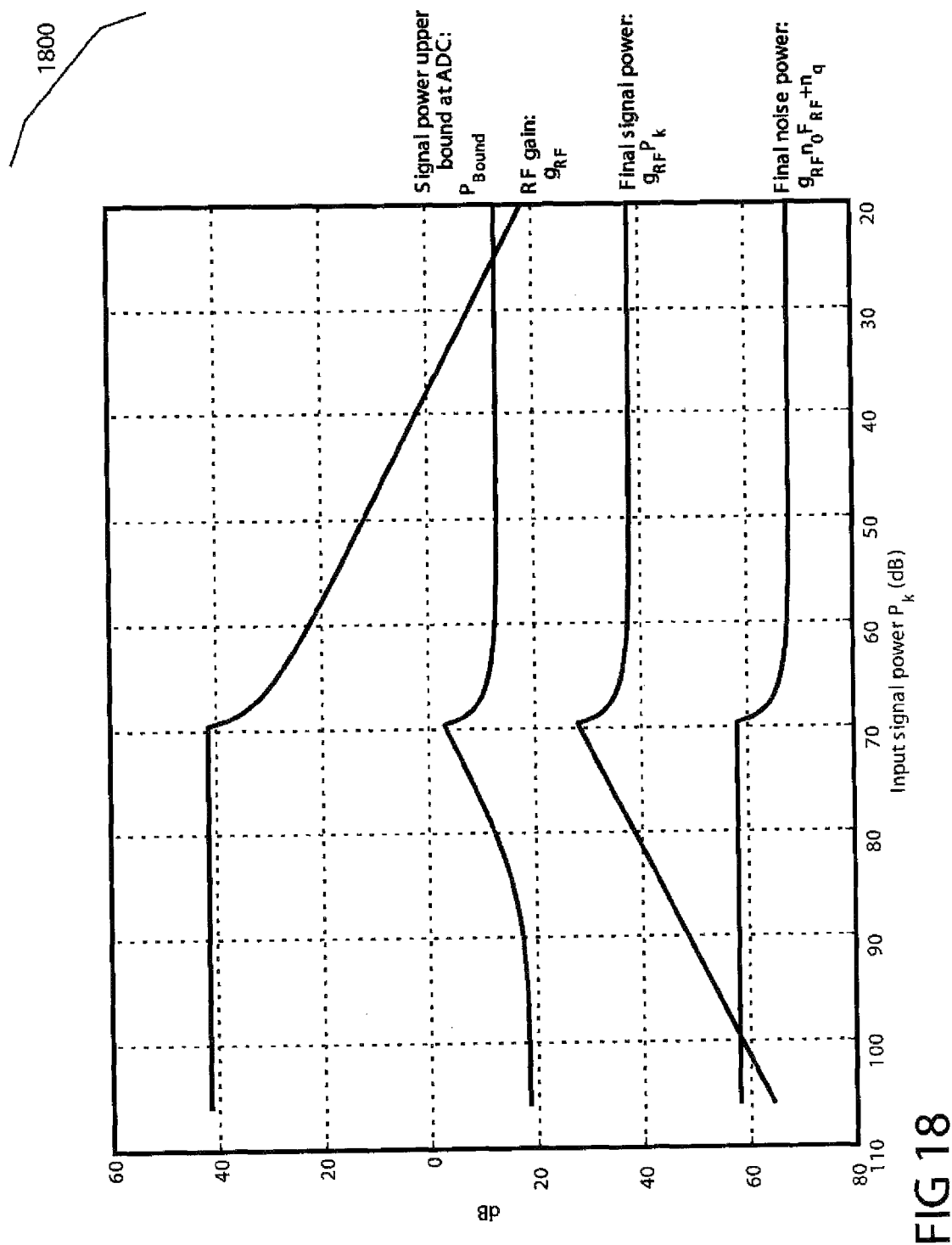
Figure 19:
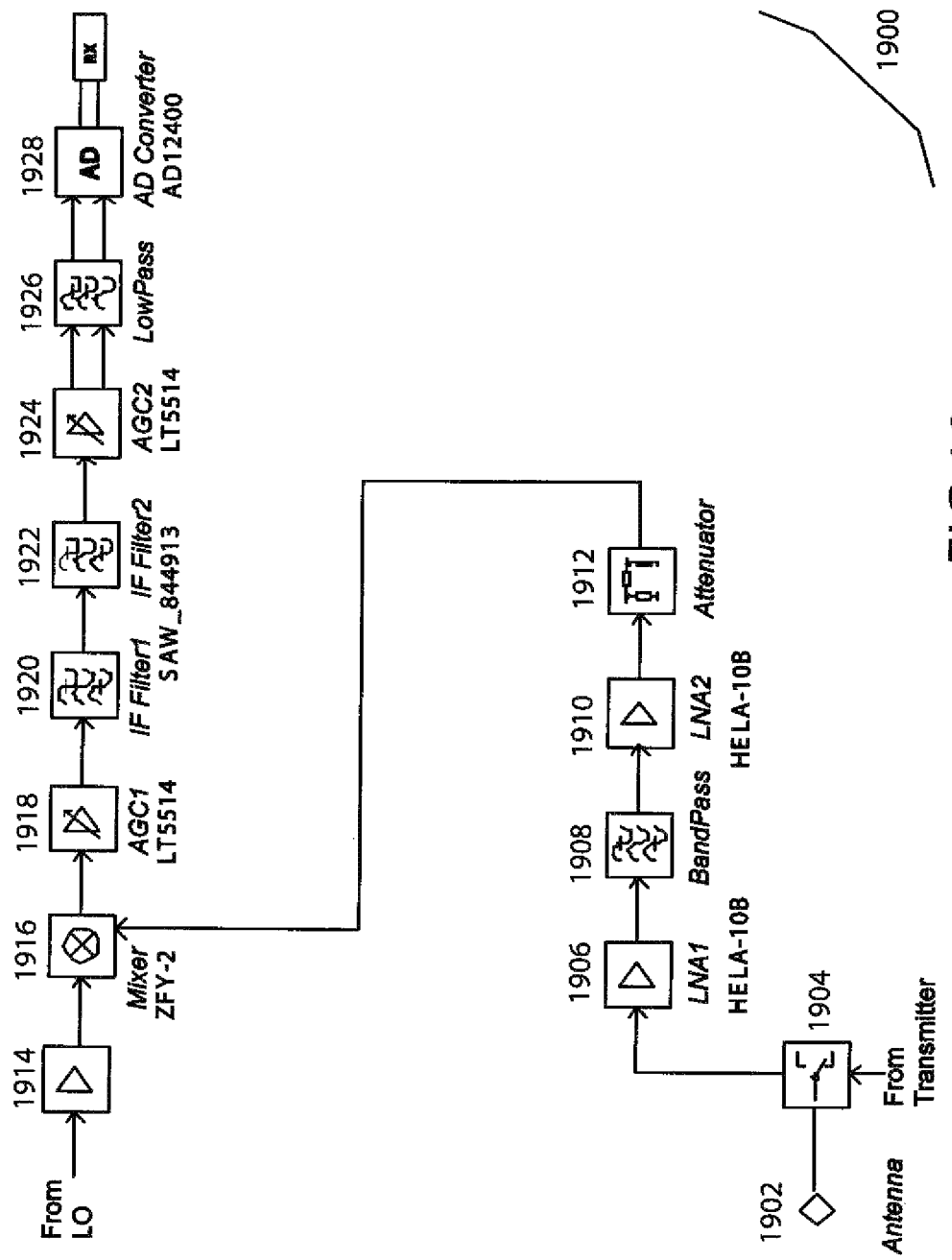
Figure 20:
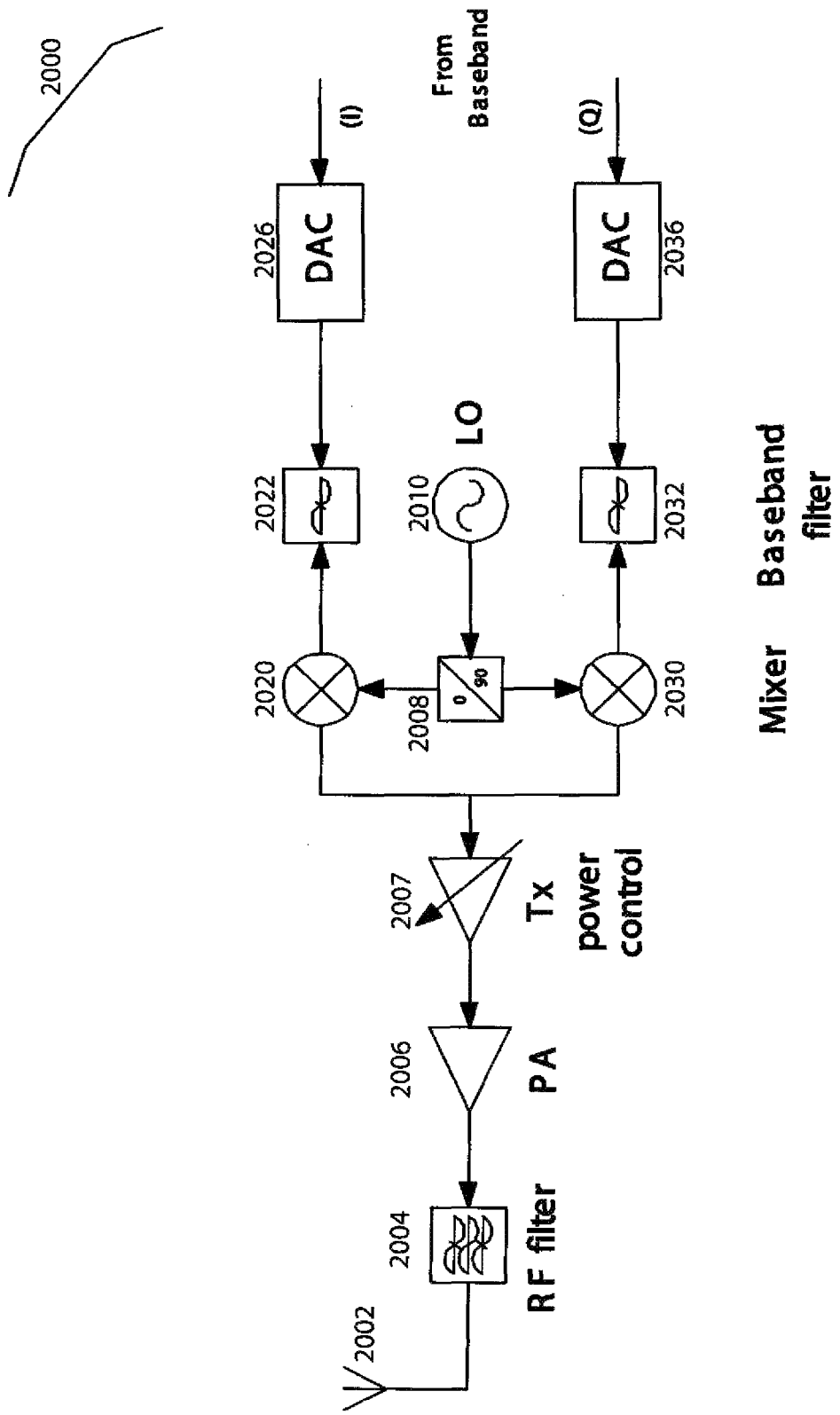
Figure 21:
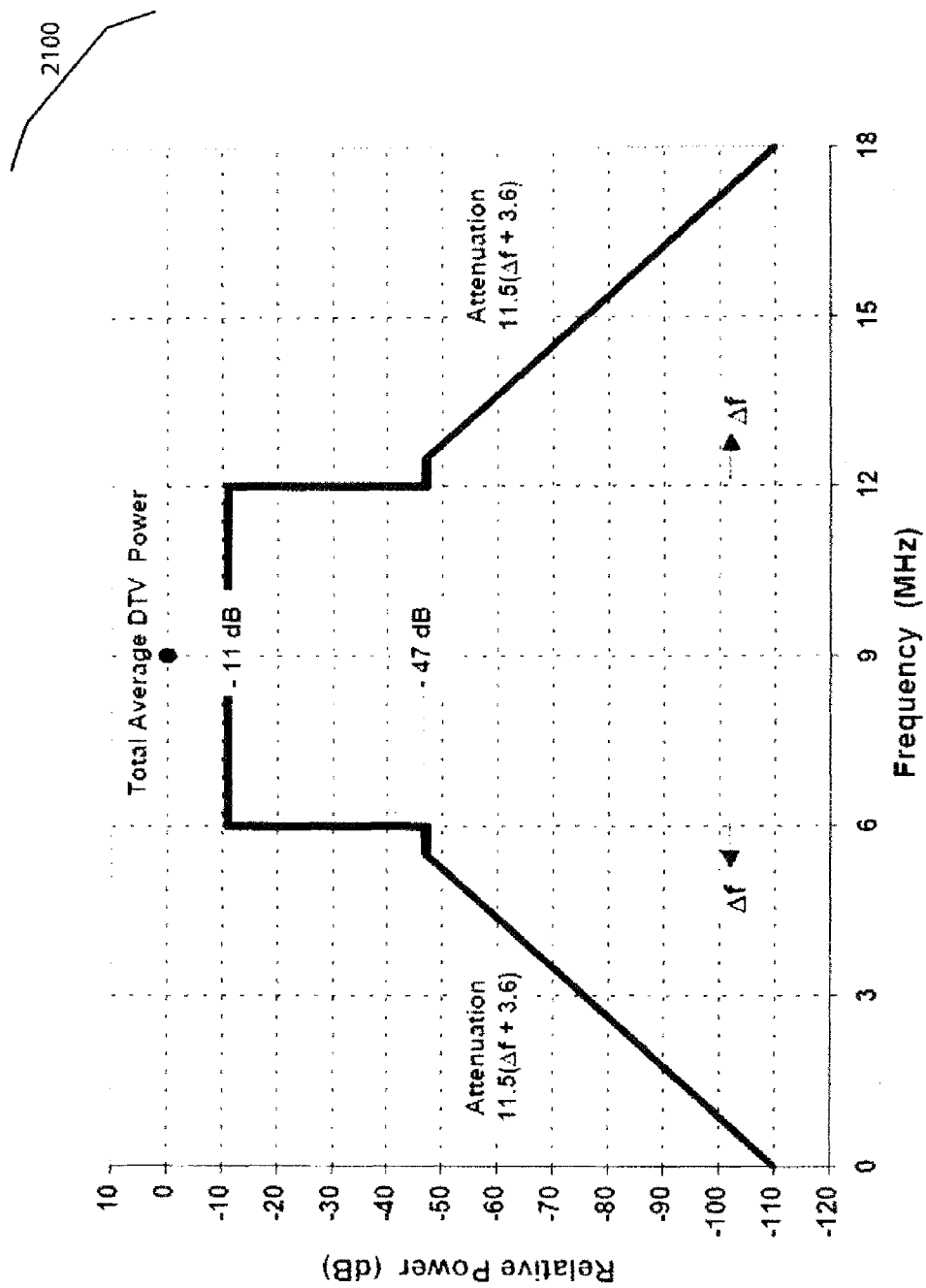
Figure 22:
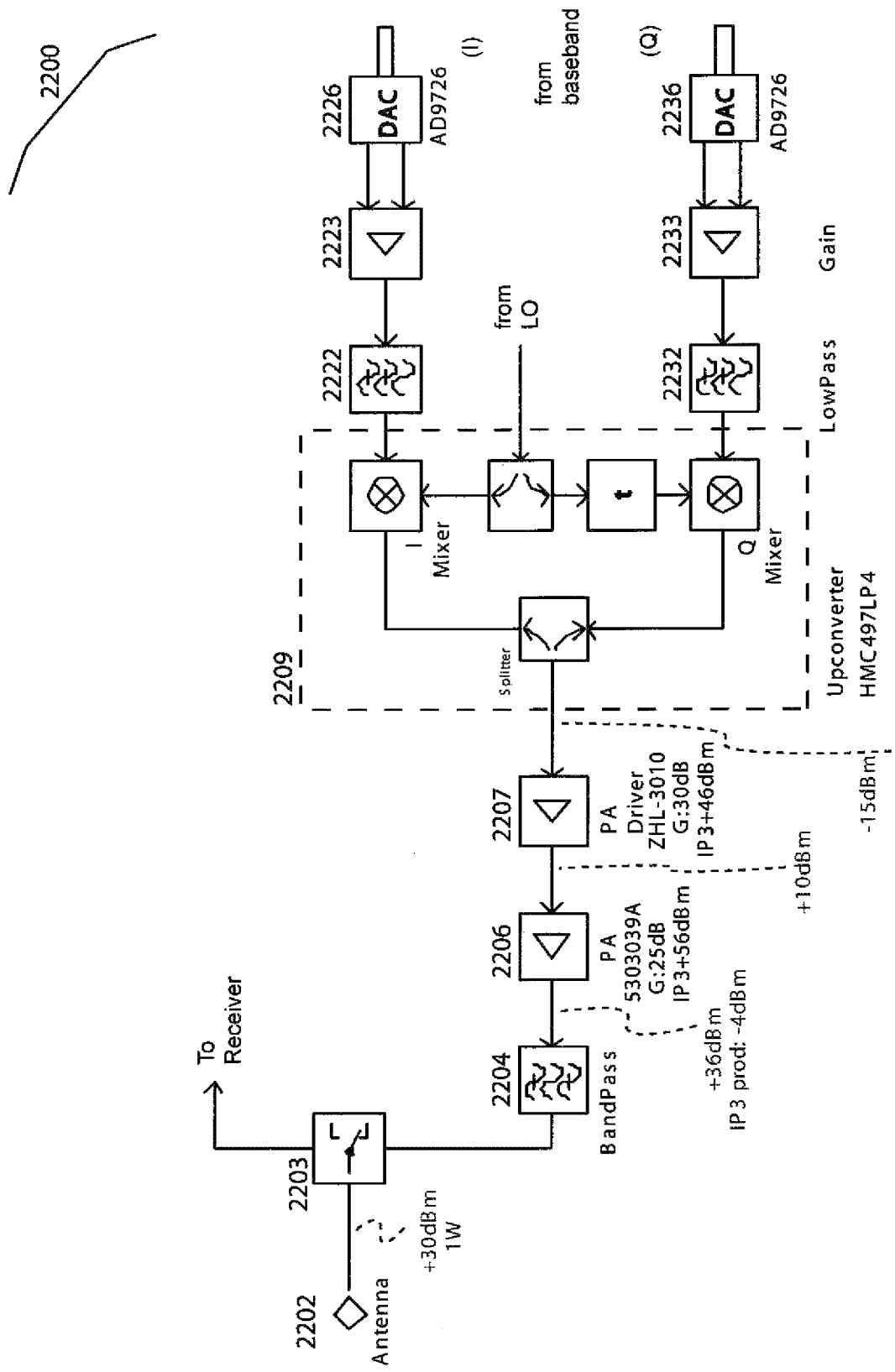

As discussed regards Receiver Chain Gain Planning, a per channel thermal noise floor $n_0^{dB}$ of -106 dBm can be specified, a per channel quantization noise floor $n_q^{dB}$ of -68 dBm can be specified, and a receiver chain noise figure $F_{thrmRF}^{dB}$ of 6 dB can be specified. A SNR degradation due to the quantization noise can be required to be 0.46 dB, corresponding to an $X^{dB}$ value of 10 dB. A total RF chain amplification requirement can be obtained from the following SNR equation $$SNR_{Final}^{dB} = 10\log_{10}\frac{g_{RF}P_k}{g_{RF}n_0 F_{RF}+n_q} \tag{53}$$

$$= \min\{30 \text{ dB}, P_k^{dB} - (n_0^{dB} + F_{RF}^{dB}) - 0.46\}$$

where $SNR_{Final}^{dB}$ is SNR measured at the baseband input; $g_{RF}$ is total RF chain gain; and $P_k$ is input (received) signal power of a target channel. It can be appreciated that the SNR ceiling can be set to 30 dB in order to meet specified performance levels. Graph 1800 of FIG. 18 depicts a graphical solution to Equation (53). As shown in the figure, for high input power levels the gain required can be reduced as a result of a SNR ceiling at 30 dB.

A total input signal power can be expressed $$P_k + (P_{k-1} + P_{k+1}) + \sum_{l\in\Omega'} P_l \tag{54}$$

where $\Omega'$ can be a whole channel set excluding channels k and k±1. Assuming a SAW filter rejection mask as shown in Diagram 1700, after SAW filtering, a total signal power can be expressed:

$$P_k + 10^{-\frac{15}{10}}(P_{k-1} + P_{k+1}) + 10^{-\frac{40}{10}}\sum_{l\in\Omega'} P_l \tag{55}$$

and a total signal power at an ADC (after RF chain amplification) can be expressed:

$$g_{RF}\left[P_k + 10^{-\frac{15}{10}}(P_{k-1} + P_{k+1}) + 10^{-\frac{40}{10}}\sum_{l\in\Omega'} P_l\right] \tag{56}$$

A condition can be imposed that the signal powers of the two adjacent channels satisfy $$10\log_{10}\frac{P_{k-1}+P_{k+1}}{P_k} < A^{dB} \tag{57}$$

where $A^{dB}$ can be a maximum specified adjacent channel power differential, e.g. 40 dB. Without this condition, adjacent channel leakage could overwhelm a signal in a desired channel (e.g. referring to the DTV transmission mask in Diagram 2100). Assuming a maximum total input signal power of -20 dBm, signal power at the ADC can have an upper bound $P_{Bound}$ such that:

$$g_{RF}\left[P_k + 10^{-\frac{15}{10}}(P_{k-1} + P_{k+1}) + 10^{-\frac{40}{10}}\sum_{l\in\Omega'} P_l\right] < \tag{58}$$

-continued $$g_{RF}\left[P_k + 10^{-\frac{15}{10}}AP_k + 10^{-\frac{40}{10}}\sum_{l\in\Omega'}P_l\right] <$$

$$g_{RF}\left[P_k + 10^{-\frac{15}{10}}10^{\frac{40}{10}}P_k + 10^{-\frac{40}{10}}10^{-\frac{20}{10}}\right] = P_{Bound} \quad (5)$$

where in the second inequality $A^{dB}$ can be specified as 40 dB and a constraint that $\Sigma_{l\in\Omega}P_l$ is less than −20 dBm can be employed. This upper bound is plotted in Diagram 1800.

According to Diagram 1800, a maximum possible signal power at an ADC can be less than −3 dBm. A thermal noise power, shown as Final noise power in Diagram 1800, at this point can be −58 dBm. An IP3 requirement for an amplifier in the signal chain just prior to an ADC can then be expressed $$-3 + \frac{-3-(-58)}{2} = 24.5 \text{ dBm} \quad (59)$$

In some embodiments, a 140 MHz IF signal can be down-converted to a baseband using a conventional down-conversion approach as shown in Diagram 600. Alternative embodiments can employ direct IF sampling with digital down-conversion. In some embodiments, ADCs with 400 MHz and/or greater sampling frequencies [8,9,12] can be used to perform direct IF sampling.

In some embodiments, an LNA and a mixer can provide enough gain to overcome a SAW filter insertion loss, which can have a typical value of 20 dB. Exemplary low-loss SAW filters (with 10 dB insertion loss) are available [Integrated Device Technology, Inc., "Saw Filter Products", http://www.idt.com/?id=3350]. Employing such SAW filters in some embodiments can contribute to relaxing a specified amplification requirement on an LNA and mixer. As shown in Diagram 1800, an RF chain can be specified to provide an adjustable gain range of 60 dB, i.e. from −20 dB to +40 dB. In some embodiments an LNA and mixer can provide a switchable gain step of 20 dB. One or more amplifier(s) following a SAW filter can then provide an adjustable gain of between 0 and 40 dB. This gain can be combined with a 20 dB LNA-mixer gain step and can provide a specified 60 dB dynamic range. Automatic gain control (AGC) can be employed to ensure correct gain levels at an LNA and mixer and gain-adjustable amplifier(s), under the condition of varying input signal powers, in order to achieve optimal system performance.

Example System:

Diagram 1900 depicts a block diagram embodiment of an example single-channel heterodyne receiver wherein exemplary cascaded SAW filters can be used to achieve a desired level of channel selectivity.

Many exemplary processing components are identified.

The system of diagram 1900 comprises individual processing elements well known in the art and/or described herein. Each of these elements is generally identified herein with a name and/or abbreviation that corresponds to its well known and/or herein described function. Analog filters comprise BandPass 1908 and Lowpass 1926. Exemplary SAW filters comprise IF Filter1 1920 and IF Filter2 1922. Gain modifying elements comprise low noise amplifiers LNA1 1906 and LNA2 1910, automatic gain control AGC1 1918 and AGC2 1924. Analog to digital converters comprise AD 1928. Mixers comprise Mixer 1916. Attenuators comprise Attenuator 1912.

LNA1 1906 can be selectably coupled with Antenna 1902 via switch 1904. When so coupled, LNA1 1906 can receive a signal from Antenna 1902. BandPass 1908 can be coupled with and receive a signal from LNA1 1906. LNA2 1910 can be coupled with and receive a signal from BandPass 1908. Attenuator 1912 can be coupled with and receive a signal from LNA2 1910. Mixer 1916 can be coupled with and receive a signal from Attenuator 1912. Mixer 1916 can be coupled with and receive a signal from Buffer 1914.

Buffer 1914 can provide an LO signal, as from an oscillator.

AGC1 1918 can be coupled with and receive a signal from Mixer 1916. IF Filter1 1920 can be coupled with and receive a signal from AGC1 1918. IF Filter2 1922 can be coupled with and receive a signal from IF Filter1 1920. AGC2 1924 can be coupled with and receive a signal from IF Filter2 1922. Lowpass 1926 can be coupled with and receive a signal from AGC2 1924. AD 1928 can be coupled with and receive a signal from Lowpass 1926.

AD 1186 can provide a baseband component signal.

In some embodiments, an exemplary ADC, Analog Devices' AD12401 [Analog Devices, Inc. AD12401, May 2006, op.cit.], a 12-bit 400 MHz ADC, can be used for direct IF sampling. The following table shows a system gain analysis. An exemplary SAW filter can have adjacent channel rejection of 8 dB and "Max. output power" can be reduced accordingly at the output of each SAW filter. Thus for some exemplary embodiments, a resulting overall system noise figure can be computed to be about 5.2 dB.

| Name | Vendor: Part | NF (db) | Output NF (dB) | Gain (dB) | Max. output power (dBm) | IP3 (dBm) | DR (dB) |
|---|---|---|---|---|---|---|---|
| LNA1 | Mini-Circuits: HELA-10B | 3.5 | 3.5 | 12 | −8 | 47 | 110 |
| Bandpass | TBD | 3 | 3.6 | −3 | −11 | ∞ | ∞ |
| LNA2 | Mini-Circuits: HELA-10B | 3.5 | 3.9 | 12 | 1 | 47 | 92 |
| Attenuator | TBD | 4 | 3.9 | −4 | −3 | ∞ | ∞ |
| Mixer | Mini-Circuits: ZFY-2 | 8 | 4.1 | −8 | −11 | 30 | 82 |
| AGC1 | Linear Tech: LT5514 | 7 | 4.9 | 17 | 6 | 47 | 82 |
| IF Filter 1 | Sawtek: 854913 | 6 | 4.9 | −6 | −8 | ∞ | ∞ |
| IF Filter 2 | Sawtek: 854913 | 6 | 4.9 | −6 | −22 | ∞ | ∞ |
| AGC2 | Linear Tech: LT5514 | 7 | 5.2 | 31 | 9 | 47 | 76 |
| Lowpass | TBD | 3 | 5.2 | −3 | 6 | ∞ | ∞ |

Transmitter Architecture

Diagram 2000 depicts an embodiment of a wideband direct-conversion transmitter comprising a similar structure as that of the wideband direct-conversion receiver of Diagram 800. ADC elements 826 836 and DAC elements 2026 2036 have corresponding positions within the depicted signal processing chains, respectively. The position of LNA 806 corresponds to that of PA 2006. Essentially the same frequency planning approaches as discussed regarding direct-conversion receiver embodiments can be employed regarding direct-conversion transmitter embodiments. In some embodiments, a mixing stage in diagram 2000 can perform an up-conversion function; the mixing stage can comprise Mixer 2020 and Mixer 2030, and Quad splitter 2008.

Each of the digital to analog converters DAC 2026 2036 can provide a digital to analog conversion function to a corresponding received analog signal.

Each of the converters DAC 2026 2036 can be provided with a baseband component signal (I and Q, respectively).

Each of the Baseband filters 2022 2032 can provide a filtering function to a corresponding received signal.

Baseband filter 2022 can be coupled with and receive a signal from DAC 2026. Baseband filter 2032 can be coupled with and receive a signal from DAC 2036.

Oscillator LO 2010 can provide a signal that can be a tone signal at a specified frequency.

Quad splitter 2008 can provide a quadrature splitting function to a received signal, thereby providing an in-phase (I) and a quadrature (Q) signal.

Quad splitter 2008 can be coupled with and receive a signal from LO 2010.

Mixer 2020 can be coupled with and receive a signal of a first specified phase from Quad splitter 2008.

Mixer 2020 can be coupled with and receive a filtered signal from Baseband filter 2022.

Mixer 2030 can be coupled with and receive a signal of a second specified phase from Quad splitter 2008.

Mixer 2030 can be coupled with and receive a filtered signal from Baseband filter 2032.

Mixer 2020 can provide a mixing function, providing a signal responsive to a signal received from Quad splitter 2008 and responsive to a signal received from Baseband filter 2022. Similarly, Mixer 2030 can provide a mixing function, providing a signal responsive to a signal of a second specified phase received from Quad splitter 2008 and responsive to a signal received from Baseband filter 2032.

Tx Power Control 2007 can provide a transmission power control function to a received signal and/or received combination of signals. A transmission power control function can comprise a selectably adjustable gain and/or predistortion and/or any other known and/or convenient transmission power control techniques.

Tx Power Control 2007 can be coupled with and receive a combination of signals from Mixer 2020 and Mixer 2030. In some embodiments, a combiner element can be employed to combine signals from Mixer 2020 and Mixer 2030.

A power amplifier PA 2006 can provide a power amplification function to a received signal.

PA 2006 can be coupled with and receive a signal from Tx Power Control 2007.

RF filter 2004 can provide a filtering function to a received signal.

RF filter 2004 can be coupled with and receive a power-amplified signal from PA 2006.

Antenna 2002 can provide an antenna transmission function to a received signal.

Antenna 2002 can be coupled with and receive a filtered signal from RF filter 2004.

Antenna 2002 can provide transmission of a signal responsive to a filtered signal received from RF filter 2004.

A maximum transmission power can be limited to 1 W or 30 dBm according to the NPRM [FCC, May 2004, op. cit.]. Considering the same exemplary 16-bit DAC as previously discussed, a maximum signal power out of the DAC can be calculated $$10\log_{10}\left(2 \times \frac{0.5^2}{50} \times 10^3\right) = 10 \text{ dBm} \qquad (60)$$

Alternative modulation schemes can have varying backoff requirements. For example, if OFDM is used, a backoff of 2.5 bits translating into a power loss of 15 dB can be required. A maximum signal power out of a DAC 2026 2036 can then be −5 dBm. A total transmitter RF chain amplification of 35 dB can then be needed before a signal reaches the antenna. A PA 2006 can typically provide 20 dB to 30 dB of gain. Additional amplification stages can then be needed between a PA 2006 and a DAC (2026 and/or 2036).

Transmitter power control (TPC) can be helpful in improving wireless system capacity. TPC can be achieved using a variable gain amplifier 2007 as shown in Diagram 2000. Alternatively, by employing a DAC with an ample number of bits (16), transmission power control can also be achieved using the DAC. For example, the top 8 bits of a DAC output can be dedicated to TPC. This can provide a total of 8×6=48 dB TPC range. In some embodiments, the remaining 8 DAC bits can be used for OFDM modulation: 2.5 bits for backoff and 5.5 bits for OFDM signal representation.

The FCC may adopt the same DTV transmit mask as shown in Graph 200 for a TV-band cognitive radio. Given a modulation format, using the spectrum mask, linearity requirements of RF components can be derived.

Since a PA can provide a last amplification stage, transmit chain nonlinearity can be dominated by that of the PA. Digital pre-distortion can be used for PA linearization. Digital pre-distortion techniques can be considered in a baseband system design.

Diagram 2200 depicts a block diagram in some detail of an example embodiment of a wideband direct-conversion transmitter architecture essentially as depicted in Diagram 2000. In some embodiments, an exemplary integrated wideband up-converter HMC497LP4 from Hittite Microwave can be used for signal up-conversion. In some embodiments, an exemplary Mini-Circuits ZHL-3010 amplifier can be used as a PA driver. In some embodiments, an Ophir 5303039A PA can have an output IP3 of 56 dBm and can provide an output power of 36 dBm with out-of-band emission level at −4 dBm. Notably, in some embodiments, every 1 dB reduction in transmission power can result in a 2 dB reduction in out-of-band emissions.

Transmission power control can be employed in some embodiments to reduce out-of-band emissions.

The system of diagram 2200 comprises individual processing elements well known in the art and/or described herein. Each of these elements is generally identified herein with a name and/or abbreviation that corresponds to its well known and/or herein described function. Analog filters comprise BandPass 2204 and Lowpass 2222 2232. Gain modifying elements comprise Gain 2223 2233, PA 2206, and VGA 2207. Digital to analog converters comprise DAC 2226 2236. An Upconverter 2209 can comprise splitter/combiners, mixers, and a delay element. In some embodiments an Upconverter 2209 can be adapted to combine received (I) and (Q) baseband component signals into a signal having a modulating or carrier signal at the frequency of a received LO signal; hence "upconversion". In some embodiments VGA 2207 can be adapted to provide transmission power control.

Gain 2223 can be coupled with and receive a signal from DAC 2226. Lowpass 2222 can be coupled with and receive a signal from Gain 2223. Upconverter 2209 can be coupled with and receive a baseband component signal from Lowpass 2222. Gain 2233 can be coupled with and receive a signal from DAC 2236. Lowpass 2232 can be coupled with and receive a signal from Gain 2233. Upconverter 2209 can receive an LO signal.

VGA 2207 can be coupled with and receive a modulated signal from Upconverter 2209. PA 2206 can be coupled with and receive a signal from VGA 2207. BandPass 2204 can be coupled with and receive a signal from PA 2206. Antenna 2202 can be selectably coupled via Switch 2203 with Band-Pass 2204. When so coupled, Antenna 2202 can receive a signal from BandPass 2204 When so coupled, Antenna 2202 can provide transmission of a signal responsive to a filtered signal received from BandPass 2204.

Baseband System Analysis:

A baseband system design is described herein.

FFT/IFFT-based digital filtering and reconstruction for arbitrary channel rejection:

A double-ADC architecture for a wideband direct-conversion TV-band cognitive radio receiver is herein described. An enabling function for this architecture can be channel rejection through digital filtering and reconstruction. Herein described is such a channel rejection method from a baseband perspective.

Channel filtering can be accomplished using a common digital filter, e.g. a raised-cosine filter. It can also be achieved using an FFT and IFFT pair in combination. The latter approach can be especially efficient in simultaneous filtering of multiple channels, as required in some embodiments.

Herein described are derivations of a continuous-time version of the operations of FFT/IFFT based filtering and reconstruction. Equivalent discrete-time version of the operations are subsequently described Channel Rejection Analysis:

Referring to Equation (37), suppose a total signal is $$y(t) = \sum_{k \subset \Omega} y_k(t) = \sum_{k \subset \Omega} [x_k(t) + q_k(t)] e^{j2\pi f_k t} \tag{61}$$

from which a designated set of channels are to be rejected $$\sum_{l \in \Lambda} y_l(t) \tag{62}$$

An input signal can be truncated using a time-domain window w(t):

$$y_1(t) = w(t)y(t) \tag{63}$$

which can then be "FFT'd" in order to generate a frequency-domain signal representation $$Y_1(f) = F[y_1(t)] = W(f) \otimes \sum_{k \in \Omega} Y_k(f) \tag{64}$$

To retrieve the signal on a particular channel $l \in \Lambda$, a frequency-domain rectangular window on $Y_1(f)$ can be applied:

$$Y_l(f) = \Pi_{2C}(f-f_l)Y_1(f) \tag{65}$$

where $\Pi_{2C}(f)$ is a rectangular window over the frequency range $[-C,C]$ with $$C = 3 \text{ MHz} + \Delta \tag{66}$$

and $\Delta$ being the excess filter bandwidth. For all the channels in $\Lambda$, then $$Y'(f) = \sum_{l \in \Lambda} Y_l(f) = \left[\sum_{l \in \Lambda} \Pi_{2C}(f-f_l)\right] Y_1(f) \tag{67}$$

Note that for simplifying assumption that the channels in $\Lambda$ are disjoint. In the case of contiguous channels, an overall rectangular window can be applied to the contiguous channels. The signal Y'(f) can then be transformed to time domain in order to generate y'(t) as a reconstructed version of the signals on the channels in $\Lambda$.

In order to evaluate how much rejection can be achieved, the signal y'(t) can be subtracted from $y_1(t)$:

$$y_1(t) - y'(t) = w(t)y(t) - y'(t) \tag{68}$$

$$= w(t)\left[\sum_{k \in (\Omega - \Lambda)} y_k(t)\right] + \left[w(t)\sum_{l \in \Lambda} y_l(t) - y'(t)\right]$$

So the remaining signal power on the channels in $\Lambda$ can be expressed:

$$\int_{-\infty}^{\infty} E\left[\left|w(t)\sum_{l \in \Lambda} y_l(t) - y'(t)\right|^2\right] dt \tag{69}$$

Since a similar amount of rejection can be applied to any individual channel $l \in \Lambda$, consider that $\Lambda$ only contains one channel l as a simplifying assumption. Using Parseval's theorem $$\int_{-\infty}^{\infty} E[|w(t)y_l(t) - y_l(t)|^2] dt = \int_{-\infty}^{\infty} E[|W(f) \otimes Y_l(f) - Y_l(f)|^2] df \tag{70}$$

Since the original signal power is $$\int_{-\infty}^{\infty} E[|w(t)y_l(t)|^2] dt = \int_{-\infty}^{\infty} E[|W(f) \otimes Y_l(f)|^2] df \tag{71}$$

rejection can be expressed as:

$$R^{dB} = 10\log_{10} \frac{\int_{-\infty}^{\infty} E[|W(f) \otimes Y_l(f)|^2] df}{\int_{-\infty}^{\infty} E[|W(f) \otimes Y_l(f) - Y_l(f)|^2] df} \tag{72}$$

$Y_l(f)$ can be assumed to be band-limited white Gaussian noise—a justified assumption according to the central limit theorem, if the signal $x_l(t)$ corresponds to filtered random data samples at 6 MHz, e.g. the DTV signal. This can result in $$E[Y_l(f_1)Y_l^*(f_2)] = \begin{cases} N_0\delta(f_1-f_2) & f_1, f_2 \in [f_l-B, f_l+B] \\ 0 & \text{Otherwise} \end{cases} \tag{73}$$

where in some embodiments B=3 MHz. A spectral power of the original signal, i.e. $E[|W(f) \otimes Y_l(f)|^2]$, can be calculated as:

$$E[|W(f) \otimes Y_l(f)|^2] = E\left[\int_{-\infty}^{\infty} W(f-u)Y_l(u)du \int_{-\infty}^{\infty} W^*(f-v)Y_l^*(v)dv\right] \tag{74}$$

-continued $$= E\begin{bmatrix} \int_{f_l-B}^{f_l+B} W(f-u)Y_l(u)du \\ \int_{f_l-B}^{f_l+B} W^*(f-v)Y_l^*(v)dv \end{bmatrix}$$

$$= \int_{f_l-B}^{f_l+B}\int_{f_l-B}^{f_l+B} du\,dv\,W(f-u)W^*(f-v)$$

$$E[Y_l(u)Y_l^*(v)]$$

$$= \int_{f_l-B}^{f_l+B}\int_{f_l-B}^{f_l+B} du\,dv\,W(f-u)W^*(f-v)$$

$$N_0\delta(u-v)$$

$$= N_0\int_{-B}^{+B} |W(f-f_l-u)|^2 du$$

Now considering the spectral power after rejection, i.e. $E[|W(f) \otimes Y_l(f) - Y_l(f)|^2]$. Inner terms can be expressed:

$$W(f)\otimes Y_l(f) - Y_l(f) = W(f)\otimes Y_l(f) - \prod_{2C}(f-f_l) \quad (75)$$

$$\left[W(f)\otimes \sum_{k\in\Omega} Y_k(f)\right]$$

$$\approx W(f)\otimes Y_l(f) - \prod_{2C}(f-f_l)$$

$$[W(f)\otimes Y_l(f)]$$

$$= \left[1 - \prod_{2C}(f-f_l)\right]W(f)\otimes Y_l(f)$$

where an approximation can be taken because the signal $Y_l(f)$ on channel l inside the rectangular window $\Pi_{2C}(f-f_l)$ is far stronger (which is the reason it is being rejected) than the signals on the other channels whose power leakages into the channel are then negligible. From the above, it follows:

$$E[|W(f)\otimes Y_l(f) - Y_l(f)|^2] = \left[1 - \prod_{2C}(f-f_l)\right]^2 \quad (76)$$

$$E[|W(f)\otimes Y_l(f)|^2]$$

$$= \left[1 - \prod_{2C}(f-f_l)\right]$$

$$N_0\int_{-B}^{+B}|W(f-f_l-u)|^2 du$$

Let $$K(f) = \int_{-B}^{|B|} |W(f-u)|^2 du \quad (77)$$

The rejection can then be expressed as:

$$R = \frac{\int_{-\infty}^{\infty} N_0 K(f-f_l)df}{\int_{-\infty}^{\infty}\left[1-\prod_{2C}(f-f_l)\right]N_0 K(f-f_l)df} \quad (78)$$

$$= \frac{\int_{-\infty}^{\infty} K(f)df}{\int_{-\infty}^{\infty}\left[1-\prod_{2C}(f)\right]K(f)df}$$

$$R^{db} = 10\log_{10}\left[\frac{\int_{-\infty}^{\infty} K(f)df}{\int_{-\infty}^{\infty}\left[1-\prod_{2C}(f)\right]K(f)df}\right] \quad (79)$$

Assuming that the time-domain window is a raised-cosine window:

$$w(t) = \begin{cases} \frac{1}{2}+\frac{1}{2}\cos\left\{\frac{\pi}{\beta T_w}\left[t+\frac{1}{2}(1-\beta)T_w\right]\right\} & -\frac{1}{2}(1+\beta)T_w \le t \le -\frac{1}{2}(1-\beta)T_w \\ 1 & -\frac{1}{2}(1-\beta)T_w \le t \le \frac{1}{2}(1-\beta)T_w \\ \frac{1}{2}+\frac{1}{2}\cos\left\{\frac{\pi}{\beta T_w}\left[t-\frac{1}{2}(1-\beta)T_w\right]\right\} & \frac{1}{2}(1-\beta)T_w \le t \le \frac{1}{2}(1+\beta)T_w \\ 0 & \text{Otherwise} \end{cases} \quad (80)$$

with frequency-domain representation:

$$W(f) = \frac{\sin\pi f T_w}{\pi f}\frac{\cos(\pi\beta f T_w)}{1-4\beta^2 f^2 T_w^2} \quad (81)$$

In some embodiments a further assumption can be employed that an FFT of size N is employed on input signal samples at 400 MHz such that $$T_w(1+\beta) = N\frac{1}{400} \Rightarrow T_w = \frac{N/400}{(1+\beta)} \quad (82)$$

where $T_w$ is expressed in µs. Note that in some embodiments the subcarrier spacing (inverse of the FFT period) can be:

$$\frac{400}{N} \text{ MHz} = \frac{400 \times 10^3}{N} \text{ kHz} \quad (83)$$

Channel Rejection Performance Simulation:

Computer simulation can be employed to compute the rejection expression of Equation (79).

In some embodiments a 20-30 dB rejection can be sufficient for a double-ADC architecture as discussed herein. The following table shows three example configurations that can achieve 20 dB rejection

| N | β | Δ (kHz) |
|---|---|---|
| 512 | 0.4 | 500 |
| 1024 | 0.3 | 160 |
| 2048 | 0.2 | 30 |

Equivalent Discrete-Time Operations for Filtering and Reconstruction:

An embodiment utlilizing equivalent discrete-time operations can be described.

A windowing function can be applied $$y_1(n) = w(n)y(n) \quad (84)$$

where w(n) is given by Equation (80) with $T_w$ given by Equation (82) and a sampling time t can be replaced by a sampling index $$n = \frac{t}{T_s} \quad (85)$$

where $$T_s = \frac{1}{400} \mu s$$

is the sampling period.

A FFT can be performed on the resulting signal $$Y_1(k) = \frac{1}{\sqrt{N}} \sum_{n=-N/2}^{N/2-1} y_1(n) e^{-j2\pi \frac{k}{N} n} \quad (86)$$

A rejection mask $\Sigma_{l \in \Lambda} \Pi_{2C}(f-f_l)$ can be applied. This operation can comprise the steps of: finding subcarriers whose indices are in the rejection mask; setting $Y'(k)=Y_1(k)$ for those subcarriers; and, nullifing $Y'(k)$ for all other subcarriers.

An inverse Fourier transform can be applied $$y'(n) = \frac{1}{\sqrt{N}} \sum_{k=-N/2}^{N/2-1} Y'(k) e^{-j2\pi k \frac{n}{N}} \quad (87)$$

Signal samples, i.e. y'(n)s, inside the flat portion of the window w(t), i.e. $t \in [-(1-\beta)T_w, (1\beta)T_w]$, can be sent to a DAC in order to construct a rejection signal y'(t).

In theory, the multiplication of two signals is only equivalent in continuous-time and discrete-time domains if the output signal is band-limited. Since w(t) is essentially time-limited, it is essentially not frequency-limited. However, because in an embodiment w(t) can have a bandwidth that is significantly narrower than the sampling bandwidth, i.e. 400 MHz, w(t) can be usefully approximated as a delta function in frequency domain. Under these conditions the continuous- and discrete-time multiplications can be essentially equivalent.

A FFT is of finite size can sample the input signal spectrum at only certain frequencies. The rejection performance result derived here for the continuous spectrum can represent an averaged performance.

The operations just described above can construct a rejection signal for the flat portion of a window. A signal in the nonflat portion of the window can require additional compensation that can introduce additional error. Constructing a rejection signal for a non-flat portion of a window can require additional FFT resources. That is, supporting a streaming operation can require overlapping two FFT windows such that their flat portions can be connected together.

Figure 23:
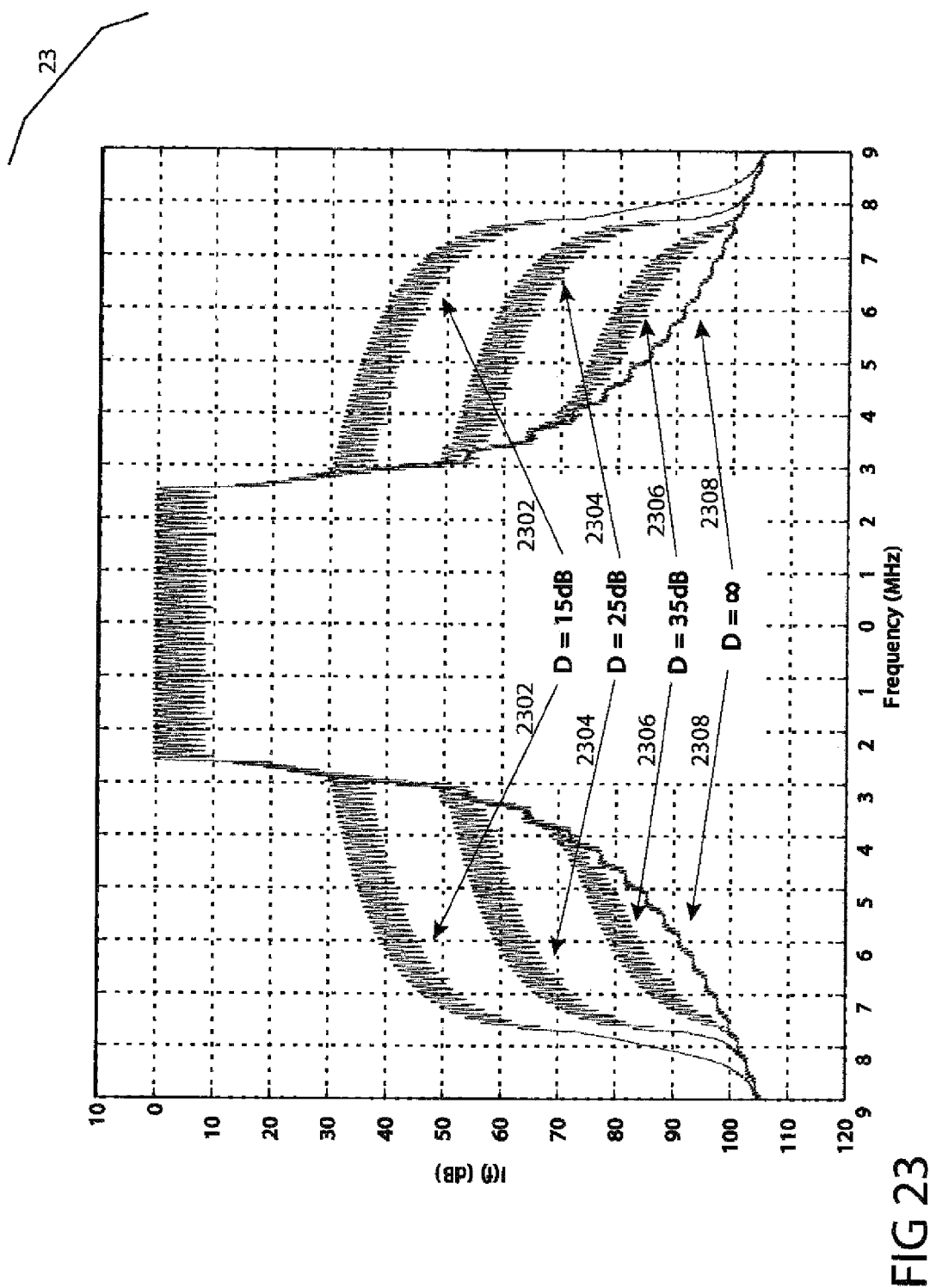

The graph 2300 of FIG. 23 shows simulated multi-carrier signal power spectrums at different IP3s (or different D s). Nonlinearity can cause spectrum "shoulders" in adjacent bands. The decibel (dB) difference between the inband signal power and the shoulder can be roughly 2D, or the system dynamic range $P_{DR}$.

The graph 2300 illustrates simulated signal power spectra under varying device nonlinearities in a multi-carrier system with subcarrier spacing 100 kHz, β=0.16, number of guard band subcarriers 8 (and number of valid data subcarriers 52). Individual curves 2302 2304 2306 2308 are shown for IP3-related distance D values of (respectively) 15 dB, 25 dB, 35 dB, and ∞.

In some embodiments with a fixed output power, a higher device IP3 can be required in order to reduce adjacent channel leakage. In some embodiments, an IP3 requirement can be reduced by applying a digital predistortion technique and/or process.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. For example, specific reference to NTSC and/or ATSC and/or DTV embodiments are provided by way of non-limiting examples. Systems and methods herein described can be applicable to any other known and/or convenient channel-based communication embodiments; these can comprise single and/or multiple carriers per channel. The specification and drawings are, accordingly, to be regarded in an illustrative rather than restrictive sense.

The invention claimed is:

1. A double ADC receiver system for cognitive radio applications comprising:
    a first analog to digital converter
        adapted to convert an input signal to a first digital signal, wherein the input signal comprises a first specified set of channels;
    a first digital filtering element
        coupled with the first analog to digital converter and
        adapted to receive the first digital signal
        and to select one or more of the first specified set of channels, thereby forming a second specified set of channels, and,
thereby forming a second digital signal;
wherein the selection of each channel of the second specified set of channels is at least partially in response to a corresponding signal to noise ratio for each channel,
wherein for each channel of the second specified set of channels, the corresponding signal to noise ratio exceeds a specified value, and,
wherein the second digital signal comprises the second specified set of channels;
a digital to analog converter
coupled with the first digital filtering element and
adapted to convert the second digital signal to a first analog signal;
a summing node
coupled with the digital to analog converter and
adapted to combine the input signal and the first analog signal,
thereby forming a second analog signal;
a second analog to digital converter
coupled with the summing node and
adapted to convert the second analog signal to a third digital signal,
wherein the third digital signal comprises a third specified set of channels and an undesirable energy corresponding to one or more specified channels of the second specified set of channels; and,
a second digital filtering element
coupled with the second analog to digital converter and
adapted to receive the third digital signal
and to at least partially remove the undesirable energy,
thereby forming a fourth digital signal,
wherein the fourth digital signal comprises a third specified set of channels.

2. The system of claim 1 further comprising:
a digital baseband processing element
coupled with the first digital filtering element and the second digital processing element and adapted
to receive the second digital signal and the fourth digital signal,
to decode one or more of the channels of the second specified set of channels, and
to decode one or more of the channels of the third specified set of channels.

3. A double ADC receiver method for cognitive radio applications comprising the steps of:
converting an input signal to a first digital signal,
wherein the input signal comprises a first specified set of channels;
selecting one or more of the first specified set of channels, thereby forming a second specified set of channels, and, thereby forming a second digital signal;
wherein the selection of each channel of the second specified set of channels is at least partially in response to a corresponding signal to noise ratio for each channel,
wherein for each channel of the second specified set of channels, the corresponding signal to noise ratio exceeds a specified value, and,
wherein the second digital signal comprises the second specified set of channels;
converting the second digital signal to a first analog signal;
combining the input signal and the first analog signal,
thereby forming a second analog signal;
converting the second analog signal to a third digital signal,
wherein the third digital signal comprises a third specified set of channels and an undesirable energy corresponding to one or more specified channels of the second specified set of channels;
filtering the third digital signal
by at least partially removing the undesirable energy,
thereby forming a fourth digital signal,
wherein the fourth digital signal comprises a third specified set of channels.

4. The method of claim 3 further comprising the step of:
decoding one or more of the channels of the second specified set of channels, at least partially in response to the second digital signal.

5. The method of claim 3 further comprising the step of:
decoding one or more of the channels of the third specified set of channels, at least partially in response to the fourth digital signal.

* * * * *